United States Patent
Robbins et al.

(10) Patent No.: US 12,070,853 B2
(45) Date of Patent: Aug. 27, 2024

(54) SOFT-RIGID ROBOTIC JOINTS CONTROLLED BY DEEP REINFORCEMENT-LEARNING

(71) Applicant: The Regents of the University of California, Oakland, CA (US)

(72) Inventors: Ash Robbins, Santa Cruz, CA (US); Mircea Teodorescu, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 243 days.

(21) Appl. No.: 17/684,489

(22) Filed: Mar. 2, 2022

(65) Prior Publication Data
US 2022/0281123 A1   Sep. 8, 2022

Related U.S. Application Data

(60) Provisional application No. 63/217,854, filed on Jul. 2, 2021, provisional application No. 63/155,490, filed on Mar. 2, 2021.

(51) Int. Cl.
*B25J 9/16*      (2006.01)
*B25J 17/00*   (2006.01)

(52) U.S. Cl.
CPC .............. *B25J 17/00* (2013.01); *B25J 9/163* (2013.01); *B25J 9/1671* (2013.01)

(58) Field of Classification Search
CPC ...... B25J 17/00; B25J 9/1671; B25J 17/0275; B25J 9/1641; B25J 9/163; G05B 2219/39186; G05B 2219/33056
See application file for complete search history.

(56) References Cited

U.S. PATENT DOCUMENTS

| | | | |
|---|---|---|---|
| 9,089,353 B2 * | 7/2015 | Farritor | A61B 34/30 |
| 9,724,169 B2 * | 8/2017 | Mohr | A61B 90/14 |
| 10,813,710 B2 * | 10/2020 | Grubbs | G09B 23/285 |
| 11,389,171 B2 * | 7/2022 | Goldsmith | A61B 17/3468 |
| 11,596,486 B2 * | 3/2023 | Rabindran | A61B 34/77 |
| 2020/0138534 A1 * | 5/2020 | Garcia Kilroy | A61G 13/08 |

(Continued)

OTHER PUBLICATIONS

Nowell et al., Design of a 3-DOF parallel mechanism for the enhancement of endonasal surgery, 2017, IEEE, p. 749-754 (Year: 2017).*

(Continued)

*Primary Examiner* — McDieunel Marc
(74) *Attorney, Agent, or Firm* — Carter, DeLuca & Farrell LLP

(57) ABSTRACT

A robotic arm having one or more hybrid (soft-rigid) joints includes a first link, a second link, and a joint interconnecting the first link and the second link, such that the first link is movable relative to the second link along an axis of motion. The joint includes: a socket component coupled to a distal end portion of the second link and a ball component coupled to a proximal end portion of first link, the ball component is configured to rotationally fit within the socket component. The joint also includes a flexible membrane encasing the socket component and the ball component. The robotic arm is controllable using a reinforcement learning algorithm training using a simulation of the robotic arm and optionally, further training in a physical world.

20 Claims, 11 Drawing Sheets

(56) References Cited

U.S. PATENT DOCUMENTS

| | | | |
|---|---|---|---|
| 2020/0214775 A1* | 7/2020 | Farritor | A61B 34/37 |
| 2023/0372039 A1* | 11/2023 | Panescu | A61B 17/3478 |

OTHER PUBLICATIONS

Lura et al., Robot kinematics based model to predict compensatory motion of transradial prosthesis while performing bilateral tasks, 2009, IEEE, p. 4100-4105 (Year: 2009).*

Li et al., The ultimate hyper redundant robotic arm based on omnidirectional joints, 2015, IEEE, p. 1840-1845 (Year: 2015).*

Dikaiakos et al., Mechatronic implementation in minimally invasive surgical instruments, 2014, IEEE, p. 357-362 (Year: 2014).*

M. Vecerik, T. Hester, J. Scholz, F. Wang, O. Pietquin, B. Piot, N. Heess, T. Rothörl, T. Lampe, M. Riedmiller, Leveraging demonstrations for deep reinforcement learning on robotics problems with sparse rewards, 2017, arXiv:1707.08817 [cs] (available at http://arxiv.org/abs/1707.08817).

A.V. Nair, V. Pong, M. Dalal, S. Bahl, S. Lin, S. Levine, "Visual Reinforcement Learning with Imagined Goals" Advances in Neural Information Processing Systems, 2018, pp. 9191-9200.

M. Tebyani, et al. "3D Printing an Assembled Biomimetic Robotic Finger", 2020 17th International Conference on Ubiquitous Robots (UR), IEEE, 2020, pp. 526-532.

P. Tomei, "Adaptive PD controller for robot manipulators", IEEE Trans. Robot. Autom. 7 (1991) 565-570.

T.D.C. Thanh, et al. "Nonlinear PID control to improve the control performance of 2 axes pneumatic artificial muscle manipulator using neural network", Mechatronics 16 (2006) 577-587.

E. Jung, et al., "Design and Selection of Muscle Excitation Patterns for Modeling a Lower Extremity Joint Inspired Tensegrity", 2019 Third IEEE International Conference on Robotic Computing (IRC), IEEE, 2019, pp. 282-287.

S. Lessard, et al., "A soft exosuit for flexible upper-extremity rehabilitation", IEEE Trans. Neural Syst. Rehabil. Eng. 26 (2018) 1604-1617.

S. Lessard, et al., "CRUX: a Compliant Robotic Upper-extremity eXosuit for lightweight, portable, multi-joint muscular augmentation", 2017 International Conference on Rehabilitation Robotics (ICORR), IEEE, 2017, pp. 1633-1638.

D. Ragonesi, et al., "Series Elastic Actuator Control of a Powered Exoskeleton" 2011 Annual International Conference of the IEEE Engineering in Medicine and Biology Society, 2011, pp. 3515-3518.

Matteo Laffranchi, et al., "Development and control of a series elastic actuator equipped with a semi active friction damper for human friendly robots", Robotics and Autonomous Systems, vol. 62, pp. 1827-1836 (2014).

E.F. Camacho, et al., "Model Predictive Control", Springer Science & Business Media, 2013.

L. Ljung, System identification, Wiley Encyclopedia Electr. Electron. Eng. 1-19 (1999).

K. Arulkumaran, et al., "Deep reinforcement learning: A brief survey", IEEE Signal Process. Mag. 34 (2017) 26-38.

V. Mnih, et al., "Human-level control through deep reinforcement learning", Nature 518 (2015) 529.

S.P. Artati, P. Van der Smagt, D.-I.N. Krüger, J.M.B. Baena, thesis, "Calculation of Human Arm Stiffness using a Biomechanical Model" Technische Universität München, 2008.

S. Fornalski, et al., "Anatomy and biomechanics of the elbow joint", Sports Med. Arthroscopy Rev. 11 (2003) 1-9.

Lilian Weng, Meta reinforcement learning, 2019, Lil'Log (available at https://lilianweng.github.io/2019/06/23/meta-reinforcement-learning.html).

P. Abbeel, A.Y. Ng, "Apprenticeship Learning via Inverse Reinforcement Learning", Proceedings of the Twenty-First International Conference on Machine Learning, in: ICML '04, Association for Computing Machinery, New York, NY, USA, 2004, p. 1, http://dx.doi.org/10.1145/1015330.1015430.

K. Hosoda, et al., "Biped robot design powered by antagonistic pneumatic actuators for multi-modal locomotion", Robot. Auton. Syst. 56 (2008) 46-53.

P. Polygerinos, et al., "Soft robotics: Review of fluiddriven intrinsically soft devices; manufacturing, sensing, control, and applications in human-robot interaction", Adv. Energy Mater. 19 (2017) 1700016.

A. Hill, A. Raffin, M. Ernestus, R. Traore, P. Dhariwal, C. Hesse, O. Klimov, A. Nichol, M. Plappert, A. Radford, J. Schulman, S. Sidor, Y. Wu, Stable Baselines, GitHub, 2018, https://github.com/hill-a/stable-baselines.

Robbins, A.S., et al., "Model-free dynamic control of robotic joints with integrated elastic ligaments", Robotics and Autonomous Systems, vol. 155, pp. 1-13 (2022).

M.H. Dickinson, C.T. Farley, R.J. Full, M. Koehl, R. Kram, S. Lehman, "How animals move: an integrative view", Science 288 (2000) 100-106.

S. Miyashita, S. Guitron, M. Ludersdorfer, C.R. Sung, D. Rus, "A Geometric Approach in Solving the Inverse of Kinematics of Puma Robots", 2015 IEEE International Conference on Robotics and Automation (ICRA), IEEE, 2015, pp. 1490-1496.

B. Koyuncu, M. Güzel, "Software development for the kinematic analysis of a lynx 6 robot arm", World Acad. Sci. Eng. Technol. International Journal of Computer, Electrical, Automation, Control and Information Engineering, vol. 1, No. 6 (2007), pp. 1575-1580.

C. Lee, M. Ziegler, "Geometric approach in solving inverse kinematics of PUMA robots", IEEE Trans. Aerosp. Electron. Syst. (1984) 695-706.

T.S. Tadele, T. de Vries, S. Stramigioli, "The safety of domestic robotics: A survey of various safety-related publications", IEEE Robot. Autom. Mag. 21 (2014) 134-142.

S. You, L.P. Robert Jr., "Human-Robot Similarity and Willingness to Work with a Robotic Co-worker", Proceedings of the 2018 ACM/IEEE International Conference on Human-Robot Interaction, 2018, pp. 251-260.

A. Vysocky, P. Novak, "Human-robot collaboration in industry", MM Sci. J. 2016 (2016) 903-906.

D. Rus, M.T. Tolley, "Design, fabrication and control of soft robots", Nature 521 (2015) 467-475.

L.B. Baltaxe-Admony, A.S. Robbins, E.A. Jung, S. Lessard, M. Teodorescu, V. SunSpiral, A. Agogino, "Simulating the Human Shoulder through Active Tensegrity Structures" Proceedings of the ASME 2016 International Design Engineering Technical Conferences and Computers and Information in Engineering Conference, American Society of Mechanical Engineers, 2016, V006T09A027.

A.P. Sabelhaus, J. Bruce, K. Caluwaerts, P. Manovi, R.F. Firoozi, S. Dobi, A.M. Agogino, V. SunSpiral, "Soft Spherical Tensegrity Robot Design Using Rod-Centered Actuation and Control" 2015 IEEE International Conference on Robotics and Automation (ICRA), IEEE, 2015, pp. 2867-2873.

C. Majidi, Soft robotics: a perspective-current trends and prospects for the future, Soft Robot. 1 (2014) 5-11.

A. Bicchi, G. Tonietti, E. Piaggio, Proc. IARP/RAS Workshop on Technical Challenges for Dependable Robots in Human Environments, 2002, pp. 79-87.

L.N. Awad, A. Esquenazi, G.E. Francisco, K.J. Nolan, A. Jayaraman, "The ReWalk ReStoreTM soft robotic exosuit: a multi-site clinical trial of the safety, reliability, and feasibility of exosuit-augmented post-stroke gait rehabilitation", J. NeuroEng. Rehabil. vol. 17, No. 80 (2020) pp. 1-11.

Y.G. Kim, M. Xiloyannis, D. Accoto, L. Masia, "Development of a Soft Exosuit for Industrial Applications", 2018 7th IEEE International Conference on Biomedical Robotics and Biomechatronics (Biorob), 2018, pp. 324-329.

H. Lee, Y. Jang, J.K. Choe, S. Lee, H. Song, J.P. Lee, N. Lone, J. Kim, "3D-printed programmable tensegrity for soft robotics", Sci. Robot. 5 (2020) pp. 1-11.

S. Li, J. Li, G. Tian, H. Shang, "Stiffness adjustment for a single-link robot arm driven by series elastic actuator in muscle training", IEEE Access 7 (2019) 65029-65039.

F. Lin, R.D. Brandt, "An optimal control approach to robust control of robot manipulators" IEEE Trans. Robot. Autom. 14 (1998) 69-77.

(56) References Cited

OTHER PUBLICATIONS

A. Bemporad, M. Morari, V. Dua, E.N. Pistikopoulos, "The explicit linear quadratic regulator for constrained systems" Automatica 38 (2002) 3-20.

T. George Thuruthel, Y. Ansari, E. Falotico, C. Laschi, "Control strategies for soft robotic manipulators: A survey" Soft Robot. 5 (2018) 149-163.

S. Chen, S. Billings, P. Grant, "Non-linear system identification using neural networks" Int. J. Control 51 (1990) 1191-1214.

J. Hwangbo, J. Lee, A. Dosovitskiy, D. Bellicoso, V. Tsounis, V. Koltun, M. Hutter, "Learning agile and dynamic motor skills for legged robots", Sci. Robot. 4 (2019), pp. 1-13.

J. Lee, J. Hwangbo, L. Wellhausen, V. Koltun, M. Hutter, "Learning quadrupedal locomotion over challenging terrain" Sci. Robot. 5 (2020) http://dx.doi.org/10.1126/scirobotics.abc5986, pp. 1-22.

T.P. Lillicrap, J.J. Hunt, A. Pritzel, N. Heess, T. Erez, Y. Tassa, D. Silver, D. Wierstra, "Continuous control with deep reinforcement learning", 2015, arXiv:1509.02971 [cs, stat] (available at http://arxiv.org/abs/1509.02971).

S. Bhagat, H. Banerjee, Z.T. Ho Tse, H. Ren, "Deep reinforcement learning for soft, flexible robots: Brief review with impending challenges" Robotics 8 (2019) 4, pp. 1-36.

H. Nguyen, H. La, "Review of Deep REinforcement Learning for Robot Manipulation" 2019 Third IEEE International Conference on Robotic Computing (IRC), 2019, pp. 590-595.

J. Kober, J.A. Bagnell, J. Peters, "Reinforcement learning in robotics: A survey" Int. J. Robot. Res. 32 (2013) 1238-1274.

Z. Zhu, K. Lin, J. Zhou, "Transfer learning in deep reinforcement learning: A survey" 2020, arXiv:2009.07888 [cs, stat] (available at http://arxiv.org/abs/2009.07888) pp. 1-20.

A.A. Rusu, M. Vecerik, T. Rothörl, N. Heess, R. Pascanu, R. Hadsell, "Sim-toreal robot learning from pixels with progressive nets" 2016, arXiv preprint arXiv:1610.04286, pp. 1-9.

X.B. Peng, M. Andrychowicz, W. Zaremba, P. Abbeel, "Sim-to-real transfer of robotic control with dynamics randomization" 2018 IEEE International Conference on Robotics and Automation (ICRA), 2018, pp. 3803-3810.

J. Tan, T. Zhang, E. Coumans, A. Iscen, Y. Bai, D. Hafner, S. Bohez, V. Vanhoucke, "Sim-to-real: Learning agile locomotion for quadruped robots", 2018, arXiv preprint arXiv:1804.10332.

G. Wu, F.C. Van der Helm, H.D. Veeger, M. Makhsous, P. Van Roy, C. Anglin, J. Nagels, A.R. Karduna, K. McQuade, X. Wang, et al., "ISB recommendation on definitions of joint coordinate systems of various joints for the reporting of human joint motion part II: shoulder, elbow, wrist and hand" J. Biomech. 38 (2005) 981-992.

M. Andrychowicz, F. Wolski, A. Ray, J. Schneider, R. Fong, P. Welinder, B. McGrew, J. Tobin, P. Abbeel, W. Zaremba, "Hindsight experience replay" 2018, arXiv:1707.01495 [cs] (available at http://arxiv.org/abs/1707.01495).

J. Tobin, R. Fong, A. Ray, J. Schneider, W. Zaremba, P. Abbeel, "Domain Randomization for Transferring Deep Neural Networks from Simulation to the Real World" 2017 IEEE/RSJ International Conference on Intelligent Robots and Systems (IROS), 2017, pp. 23-30.

Y. Bengio, Y. Louradour, R. Collobert, J. Weston, Proceedings of the 26th Annual International Conference on Machine Learning, in: ICML '09, Association for Computing Machinery, New York, NY, USA, 2009, pp. 41-48, http://dx.doi.org/10.1145/1553374.1553380.

M. Botvinick, S. Ritter, J.X. Wang, Z. Kurth-Nelson, C. Blundell, D. Hassabis, "Reinforcement learning, fast and slow" Trends Cogn. Sci. 23 (2019) 408-422.

K. Arndt, M. Hazara, A. Ghadirzadeh, V. Kyrki, "Meta Reinforcement Learning for Sim-to-Real Domain Adaptation" 2020 IEEE International Conference on Robotics and Automation (ICRA), 2020, pp. 2725-2731.

J. Ho, S. Ermon, "Generative adversarial imitation learning" Adv. Neural Inform. Process. Syst. 29 (2016) 4565-4573.

H.-J. Jung, M.B. Fisher, S.L. Woo, "Role of biomechanics in the understanding of normal, injured, and healing ligaments and tendons" BMC Sports Sci. Med. Rehabil. 1 (2009) 9., pp. 1-17.

R.F. Shepherd, F. Ilievski, W. Choi, S.A. Morin, A.A. Stokes, A.D. Mazzeo, X. Chen, M. Wang, G.M. Whitesides, "Multigait soft robot" Proc. Natl. Acad. Sci. 108 (2011) 20400-20403.

M.T. Tolley, R.F. Shepherd, B. Mosadegh, K.C. Galloway, M. Wehner, M. Karpelson, R.J. Wood, G.M. Whitesides, "A resilient, untethered soft robot" Soft Robot. 1 (2014) 213-223.

E. Todorov, T. Erez, Y. Tassa, "MuJoCo: A physics engine for model-based control" 2012 IEEE/RSJ International Conference on Intelligent Robots and Systems, IEEE, 2012, pp. 5026-5033.

T. Erez, Y. Tassa, E. Todorov, "Simultation Tools for Model-Based Robotics: Comparison of Bullet, Havok, MuJoCo, ODE and PhysX" 2015 IEEE International Conference on Robotics and Automation (ICRA), IEEE, 2015, pp. 4397-4404.

G. Brockman, V. Cheung, L. Pettersson, J. Schneider, J. Schulman, J. Tang, W. Zaremba, "OpenAI gym" 2016, CoRR.abs/1606.01540 (available at http://arxiv.org/abs/1606.01540).

S. Bennett, "Development of the PID controller" IEEE Control Syst. 13 (1993) 58-62.

R.S. Sutton, A.G. Barto, "Reinforcement Learning: An Introduction, second ed., in: Adaptive Computation and Machine Learning Series" The MIT Press, Cambridge, Massachusetts, 2018.

J. Schulman, F. Wolski, P. Dhariwal, A. Radford, O. Klimov, "Proximal policy optimization algorithms" 2017, CoRR.abs/1707.06347 (available at http://arxiv.org/abs/1707.06347).

J. Schulman, S. Levine, P. Abbeel, M. Jordan, P. Moritz, "Trust Region Policy Optimiation", International Conference on Machine Learning, 2015, pp. 1889-1897.

V. Mnih, A.P. Badia, M. Mirza, A. Graves, T. Lillicrap, T. Harley, D. Silver, K. Kavukcuoglu, "Asynchronous Methods for Deep Reinforcement Learning" International Conference on Machine Learning, 2016, pp. 1928-1937.

T. Haarnoja, A. Zhou, P. Abbeel, S. Levine, "Soft actor-critic: Off-policy maximum entropy deep reinforcement learning with a stochastic actor" 2018, arXiv preprint arXiv:1801.01290.

T. Haarnoja, A. Zhou, K. Hartikainen, G. Tucker, S. Ha, J. Tan, V. Kumar, H. Zhu, A. Gupta, P. Abbeel, S. Levine, "Soft actor-critic algorithms and applications" 2019, arXiv:1812.05905 [cs, stat] (available at http://arxiv.org/abs/1812.05905).

* cited by examiner

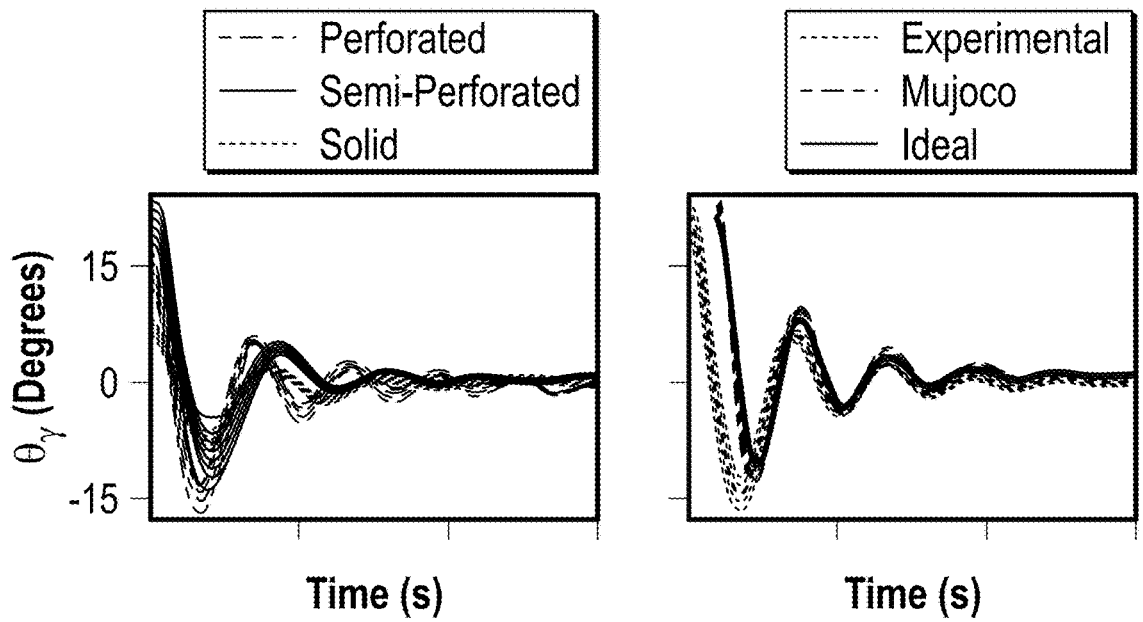
FIG. 14  FIG. 15
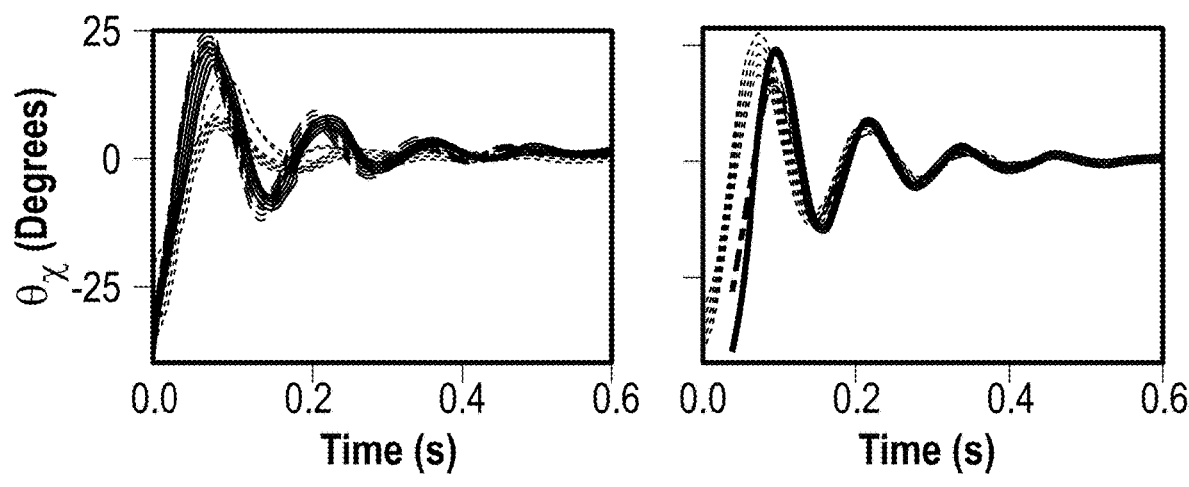
FIG. 16  FIG. 17

SOFT-RIGID ROBOTIC JOINTS CONTROLLED BY DEEP REINFORCEMENT-LEARNING

CROSS-REFERENCE TO RELATED APPLICATION

The present application claims the benefit of and priority to U.S. Provisional Application No. 63/155,490, filed on Mar. 2, 2021, and U.S. Provisional Application No. 63/217,854, filed on Jul. 2, 2021. The entire disclosures of each of the foregoing applications are incorporated by reference herein.

BACKGROUND

The combination of elasticity and rigidity found within mammalian limbs enables dexterous manipulation, agile, and versatile behavior, yet most modern robots are either primarily soft or rigid. Most mammals have ligaments that connect bone to bone, enabling joints to passively redirect forces and softly constrain the range of motion. Hybrid robots, composed of both soft and rigid parts, promote compliance to external forces while maintaining strength and stability provided by rigid robots.

Natural manipulators, such as the human arm, have been shaped by the long-term optimization of evolution. They tend to be extremely versatile, having the dexterity to work with various objects and environments. The hybrid composition of rigid and soft components—including bones, muscles, and connective tissues—yield inherent compliance and flexibility. Biological joints often have passive stability and elasticity that create mechanical feedback that benefits disturbance responses. In addition, recent progress in the mechanical complexity of robots has popularized embedding intelligence within the system. Such robots may inherently dampen motion through elastic components or enable complicated movements emerging from simple actuation, e.g., origami robots.

In contrast, traditional robot arms tend to feature rigid components that are susceptible to large moments propagating throughout the entire robot. This means the robot's structural integrity can be compromised by a large unpredictable disturbance. Robotic manipulators involving rigid joints have strictly defined degrees of freedom resulting from the mechanical design. These joints typically fit within three categories: prismatic joints (linear movement on an axis), revolute joints (rotational movement around an axis), or a combination of the two.

Rigid robotic joints are often actuated by motors that change their position directly, allowing straightforward kinematic models to calculate the joint's position. Due to their dynamics, traditional feedback control systems, such as a proportional integral derivative (PID) controller, can solve this problem relatively well, with modifications that can adapt to the influences of gravity. One modification to account for nonlinearities involves feed-forward neural networks with PID input features.

While these dynamics are effective within controlled environments, rigid robots pose dangers to both themselves and humans because of their intrinsic inability to deal with external forces. In environments where humans are directly interfacing with robots—such as industrial manufacturing or telepresence—the robot's lack of compliance can put workers and civilians at risk of injury. Measures have been taken to increase the safety of these robots, but they are not innately safe. Factors including intrinsic safety, human detection, and control techniques influence the overall safety. The risk that a robot will cause physical harm has also been shown to moderate people's willingness to work with the robot. Strategies such as safety fences and human-detection increase safety but limit the human-robot collaboration.

Flexible robots can mitigate these external forces through structural compliance while maintaining morphological similarities with rigid robots. Systems such as soft robots and tensegrity-based robots with elastic components are inherently compliant. Biologically inspired approaches tend to exemplify this behavior. The motion of legged tensegrity structures has been validated by biological simulations while simplifying the underlying bone-ligament architecture. From a bio-mimicry perspective, a human finger has been functionally recreated through one-shot three-dimensional (3D) printing techniques employing both rigid and elastic components. Soft robots can provide safe human interaction, resulting in safer environments. Soft cable-driven exo-suits can be compliant while avoiding obstruction to the user's range of motion. Intelligent design approaches have even resulted in programmable tensegrities. However, due to the non-linearities within the elastic components, these compliant robots tend to require complex models in order to be controlled properly.

Soft robotics made from elastic components increase compliance while often sacrificing stability and precision. An accurate model of the system would enable the use of modern control techniques which can provide optimal solutions. Optimal control finds the proper control values which optimize an objective function based on the system model. A Linear-Quadratic Regulator (LQR) solves the problem of minimizing a quadratic cost matrix (encoding weights of errors, energy use, etc.) over a specified time horizon, however it is expensive and demands accurate models. Model predictive control optimizes a finite time-horizon window that is repeatedly solved at each new time-step, reducing computational cost while enabling anticipation of future events. To create the model, a common method involves system identification, which can estimate the dynamics based on measurements.

However, noise in the design process can breed inconsistencies in production, and the non-linear nature of flexible robots further complicates modeling. This emphasizes the need for control methods that can learn from data. One potential solution for controlling this variation in robots involves having precisely adjusted models for each physical instance. But these approaches are cumbersome due to the requirement of constructing precise models. Thus, there is a need for a system and method of controlling soft-rigid hybrid robotic joints that overcome the deficiencies of the conventional control methodologies.

SUMMARY

The present disclosure provides a soft-rigid hybrid robotic joint with variable kinetic parameters that are controllable through learned methods. In particular, the present disclosure provides a novel approach to designing and constructing a hybrid joint through parametric design choices that adjust dynamic properties of the system. Dealing with the inherent modularity and variability necessitates a model-free controller that adjusts to new contexts in a relatively short time.

Reinforcement learning (RL) solves the above-noted deficiencies of conventional control methods through a data driven approach to solve the optimal control problem. Deep-reinforcement learning (DRL) extends this framework by using neural networks as parameter estimators. In DRL, algorithms solve for an optimal policy that will compute the control value (or action) from the current state of the system. As used herein, the term "model-free" denotes control methods that do not explicitly model the dynamics of the system.

DRL solves control problems through gathering data, surpassing human skill in the domain of games, teaching legged robots to walk, and much more. However, neural algorithms are data intensive and gathering data on robots can be incredibly costly in machine-hours, making sample efficiency important. Transfer learning provides a method for reducing training time by using prior knowledge. Whether through examples of expert trajectories or an agent trained in simulation, transfer learning involves an agent leveraging training experience from some domain A to perform better on a new task in a similar domain B. In the case of robotics, simulations provide a route to shortening real world training times through pre-trained models that can be fine-tuned on the physical robot.

The present disclosure provides a methodology for the construction of novel robotic joints with a hybrid soft-rigid structure and model-free control strategies for this class of joints. First, the joint design begins with a simplistic 3D printing approach enabling easy customization with a molding process that supports interfacing between soft and rigid parts. Customization includes modifying the perforation of the rigid components, resulting in three types of joints (i.e., perforated, semi-perforated, and solid), each with distinct ligament meshes.

Second, the joints c characterized through spring and damper experiments to provide insight in how the modification changes the dynamics. These experiments expose significant nonlinearities in the system and identify how design parameters can modulate the spring-damper terms, leading to future work of programmable dynamics. The parameters found inform a simulation, e.g., MuJoCo, enabling the use of transfer learning, e.g., transferring machine learned knowledge/algorithm from a simulation to a physical/real world. As used herein, "transfer learning" denotes training of a control algorithm that includes a DRL algorithm on a simulation (e.g., of the joint) and transferring the algorithm resulting from the training to control of the physical object, namely, the robotic joint.

The present disclosure also describes and evaluates two model-free control methodologies which require minimal user input: a proportional-integral-derivative (PID) controller and a Soft Actor-Critic (SAC) algorithm. Three tasks were designed to evaluate the accuracy of each controller. The tasks were termed: 1) increasing steps, 2) decreasing steps, and 3) sinewave. The SAC policy yields greater precision through a wider range than the tuned PID controller, and robustly solves the presented tasks by generalizing through the disclosed joint designs. Thus, the present disclosure provides a method for designing soft-rigid robotic joints with parameterizable stiffness and damping. Model-free DRL is used to compensate for variability and nonlinearities.

According to one embodiment of the present disclosure, a robotic arm is disclosed. The robotic arm includes a first link, a second link, and a joint interconnecting the first link and the second link, such that the first link is movable relative to the second link along an axis of motion. The joint includes: a socket component coupled to a distal end portion of the second link and a ball component coupled to a proximal end portion of first link, the ball component is configured to rotationally fit within the socket component. The joint also includes a flexible membrane encasing the socket component and the ball component.

Implementations of the above embodiments may include the following modifications. According to one aspect of the above embodiment, the socket component may include a first plurality of through-holes. The ball component may include a second plurality of through-holes. The first plurality of through-holes may be disposed in a first socket plane and a second socket plane. The first socket plane and the second socket plane may be perpendicular to each other and are aligned with the axis of motion. The second plurality of through-holes may be disposed in a first ball plane and a second ball plane. The first ball plane and the second ball plane may be perpendicular to each other and are aligned with the axis of motion.

According to another aspect of the above embodiment, the flexible membrane may be disposed within a space defined by the first plurality of through-holes and the second plurality of through-holes. The flexible membrane may be formed from an elastomer.

According to a further aspect of the above embodiment, the robotic arm may also include an actuator coupled to the second link and a cable coupled to the first link, wherein the actuator is configured to move the first link by spooling the cable. Each of the socket component and the ball component may include at least one routing block configured to route the cable around the joint.

According to another embodiment of the present disclosure, a method of manufacturing a robotic joint is disclosed. The method includes forming a first plurality of through-holes in a ball component; forming a second plurality of through-holes in a socket component; and inserting the ball component into the socket component to form a robotic joint, wherein the ball component is movable relative to the socket component along an axis of motion; and applying a flexible membrane over the robotic joint and within a space defined by the first plurality of through-holes and the second plurality of through-holes.

Implementations of the above embodiments may include the following modifications. According to one aspect of the above embodiment, applying the flexible membrane includes placing the robotic joint in a mold and pouring a liquid precursor composition of the flexible membrane.

According to another aspect of the above embodiment, the first plurality of through-holes may be disposed in a first socket plane and a second socket plane and the first socket plane and the second socket plane may be perpendicular to each other and are aligned with the axis of motion. The second plurality of through-holes may be disposed in a first ball plane and a second ball plane and the first ball plane and the second ball plane may be perpendicular to each other and are aligned with the axis of motion.

According to another embodiment of the present disclosure, a method for programming a control agent for controlling a robotic arm is disclosed. The method includes running a simulation of a robotic arm based on a plurality of physical parameters on a workstation; training a reinforcement learning algorithm based on the simulation of the robotic arm; and loading a control agent based on the reinforcement learning algorithm into a controller controlling the robotic arm.

Implementations of the above embodiments may include the following modifications. According to one aspect of the above embodiment, training may further include performing a plurality of tasks to reach a random point a three-dimensional space of the simulation. Training may also include implementing a reward function configured to minimize distance traveled to the random point. According to another aspect of the above embodiment, the method may also include retraining the reinforcement learning algorithm based on operation of the robotic arm in a physical space.

BRIEF DESCRIPTION OF DRAWINGS

Various embodiments of the present disclosure are described herein below with reference to the figures wherein:

FIG. 14 are plots (angle as a function of time) of drop test performed on robotic arms having a shoulder joint with a ball component being one of the three types (perforated, semi-perforated, solid) according to the present disclosure;

FIG. 15 are plots (angle as a function of time) of a drop test performed on a robotic arm having a shoulder joint with a perforated ball component, a simulated drop test, and an idealized drop test, according to the present disclosure;

FIG. 16 are plots (angle as a function of time) of drop test performed on robotic arms having an elbow joint with a ball component being one of the three types (perforated, semi-perforated, solid) according to the present disclosure;

FIG. 17 are plots (angle as a function of time) of a drop test performed on a robotic arm having an elbow joint with a perforated ball component, a simulated drop test, and an idealized drop test, according to the present disclosure;

DETAILED DESCRIPTION

Figure 1:
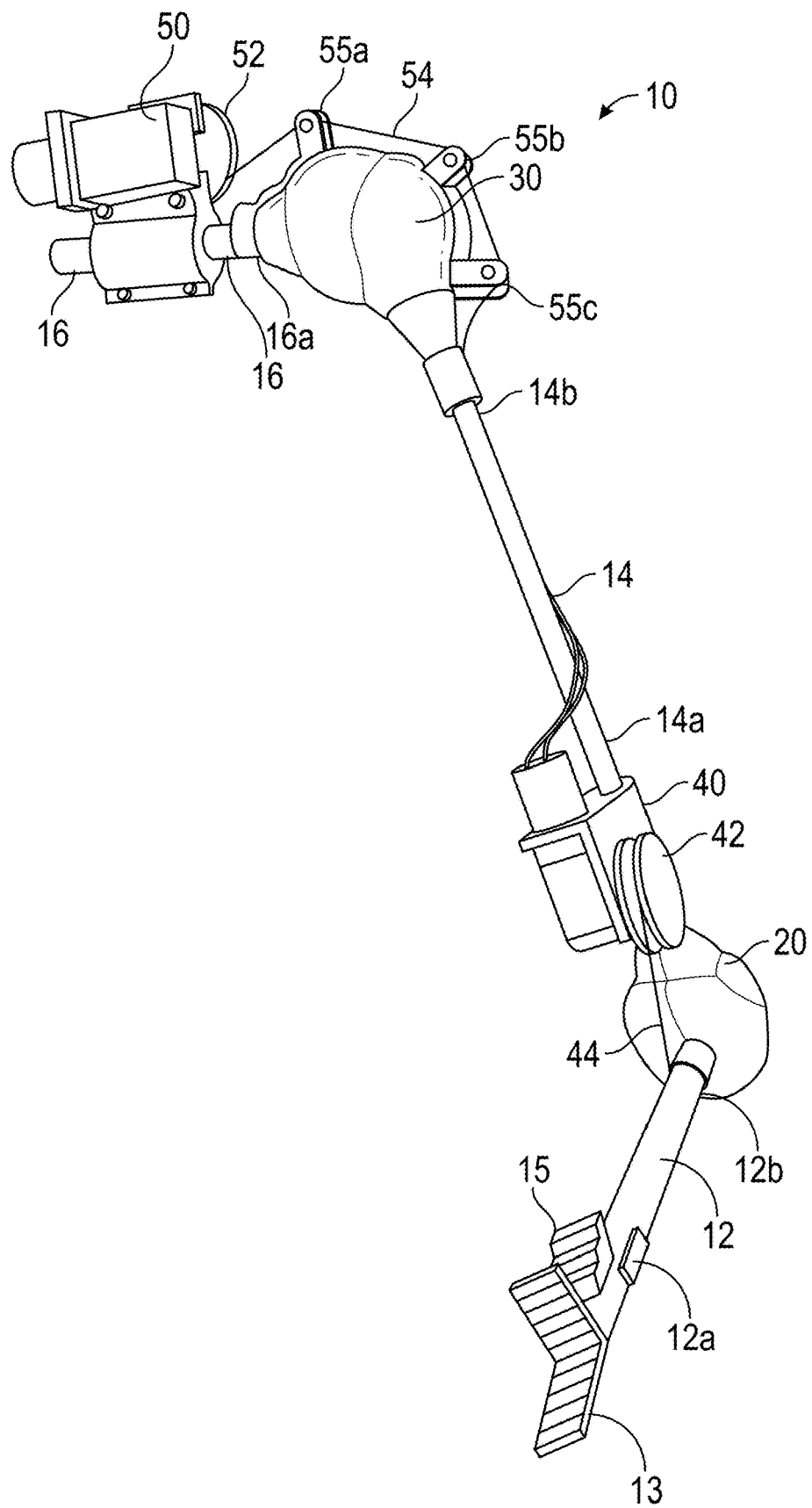
FIG. 1 is a perspective view of a robotic arm having a hybrid soft-rigid shoulder and elbow joints according to the present disclosure.
Figure 2:
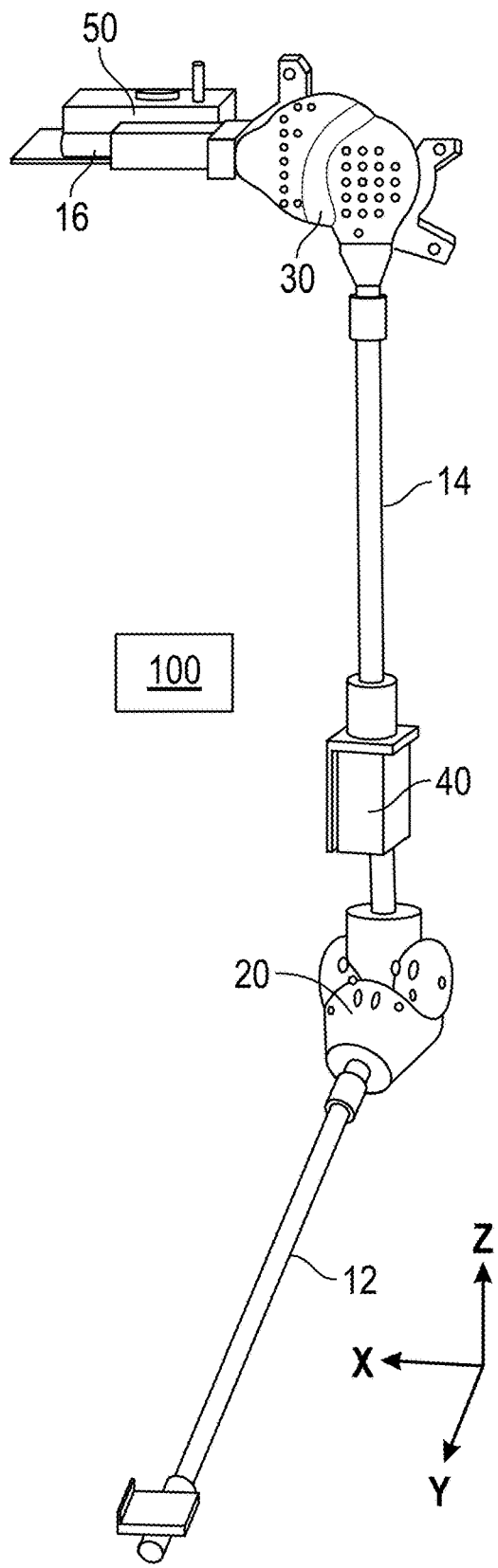
FIG. 2 is a perspective view of a 3D model of the robotic arm of FIG. 1 according to the present disclosure.

Embodiments of the presently disclosed robotic system including a robotic arm are described in detail with reference to the drawings, in which like reference numerals designate identical or corresponding elements in each of the several views. As used herein the term "distal" refers to the portion of the robotic arm that is closer to an end effector held by the robotic arm, while the term "proximal" refers to the portion that is farther from the end effector.

The terms "application" and/or "software" are used interchangeably and may include a computer program designed to perform functions, tasks, or activities for the benefit of a user. Application may refer to, for example, software running locally or remotely, as a standalone program or in a web browser, or other software which would be understood by one skilled in the art to be an application. An application may run on a controller, or on a user device, including, for example, a mobile device, a personal computer, or a server system.

The present disclosure provides a robotic arm having one or more hybrid soft-rigid joints. With reference to FIG. 1, a robotic arm 10 includes a first link 12, a second link 14, and a third link 16. The links 12, 14, 16 may be formed from any suitable rigid material, such as metal, carbon fiber, polymer, etc. The links 12, 14, 16 may have any suitable shape such as rods, bars, hollow housings, and etc. Each of the links 12, 14, 16 includes a distal end portion 12a, 14a, 16a, and a proximal end portion 12b, 14b, 16b, respectively. The first link 12 may include an end effector 13 (e.g., grasper) coupled to the distal end portion 12a. The first link 12 may also include a sensor 15, which may be disposed on the distal end portion 12a or on any other part of the robotic arm 10. In embodiments, multiple sensors 15 may be used to measure operational parameters of the robotic arm 10. The sensor 15 may be an inertial measurement unit (IMU) configured to measure angular motion, roll, pitch, yaw, and other motion parameters. The sensor 15 may include accelerometers, gyroscopes, magnetometer, and other sensors suitable for measuring these motion parameters.

The first and second links 12 and 14 are interconnected by a first joint 20, which acts like an elbow joint and the second and third links 14 and 16 are interconnected by a second joint 30, which acts like a shoulder joint. Each of the first and second joints 20 and 30 are coupled to a first actuator 40 and a second actuator 50, respectively. Each of the first and second actuators 40 and 50 may be motors coupled to first and second spools 42 and 52, respectively. The first and second actuators 40 and 50 may include various sensors, such as torque sensors, angular sensors, encoders, and the like, configured to measure force imparted by the first and second actuators 40 and 50 and angle between the first, second, and third links 12, 14, 16.

The first actuator 40 and the first spool 42 are coupled to the second link 14, namely, the distal end portion 14a. The first spool 42 includes a cable 44 securely coupled to the first link 12, such that the first spool 42 is coupled proximally with the first joint 20 and the cable 44 is coupled distally of the first joint 20, i.e., the proximal portion 12b of the first link 12. Thus, as the first actuator 40 spools and unspools the cable 44, the first link 12 moves relative to the second link 14 about the first joint 20 and in particular, as the cable 44 is spooled, a first (i.e., elbow) angle between the first and second links 12 and 14 decreases and conversely, as the cable 44 is unspooled, the first angle increases.

Figure 3:
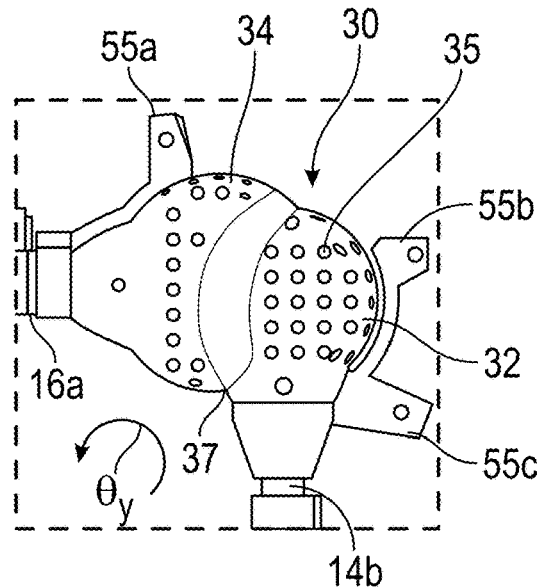
FIG. 3 is a side view of 3D model of the shoulder joint according to the present disclosure.

The second actuator 50 and the second spool 52 are coupled to the third link 16, i.e., distal end portion 16b. The second spool 52 includes a cable 54 securely coupled to the second link 14, proximal end portion 14b, such that the second spool 52 is coupled proximally of the second joint 30 and the cable 54 is coupled distally of the second joint 30. The cable 54 is routed through routing blocks 55a, 55b, 55c. The routing block 55a is disposed on the proximal end portion 16a of the third link 16 and over a socket component 34 of the second joint 30 (FIG. 3). The routing blocks 55b and 55c are disposed on a distal end portion of the second link 14 and over a ball component 32 of the second joint 30. In embodiments, any suitable number of routing blocks or configurations may be used to minimize the forces and angle of attack of the cables relative to the links of the robotic arm.

During operation, as the second actuator 50 spools and unspools the cable 54, the second link 14 moves relative to the third link 16 about the second joint 30 and in particular, as the cable is spooled, a second (i.e., shoulder) angle between the first and second links 12 and 14 decreases and conversely, as the cable 54 is unspooled, the second angle increases. In addition to a cable and spool system, various other mechanical linkages may be used, such as a belt, a drive rod, and the like.

With reference to FIGS. 2-6, each of the first and second joints 20 and 30 are ball and socket joints. The first joint 20 includes a ball component 22 and a socket component 24. Similarly, the second joint 30 includes a ball component 32 and a socket component 34. The ball components 22 and 32 as well as the socket components 24 and 34 may be solid or hollow and may have a plurality of through-holes 35 formed therethrough. The ball components 22 and 32 may be formed from any suitable rigid material, such as polymers (e.g., polylactic acid), metals, ceramics, and combinations thereof. The ball components 22 and 32 may be formed using subtractive or additive manufacturing (e.g., machining, laser cutting, 3D printing, etc.)

Figure 9:
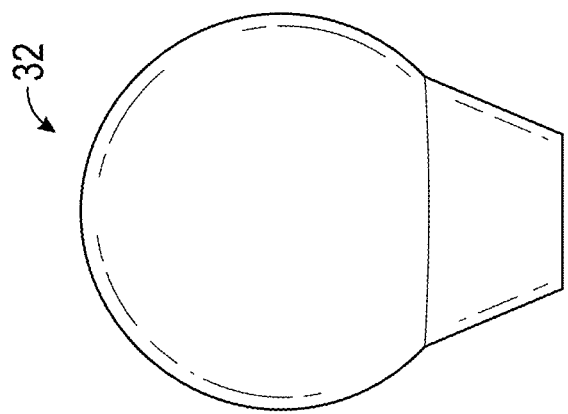
FIG. 9 is a side view of a solid ball component of the shoulder joint according to another embodiment of the present disclosure.
Figure 8:
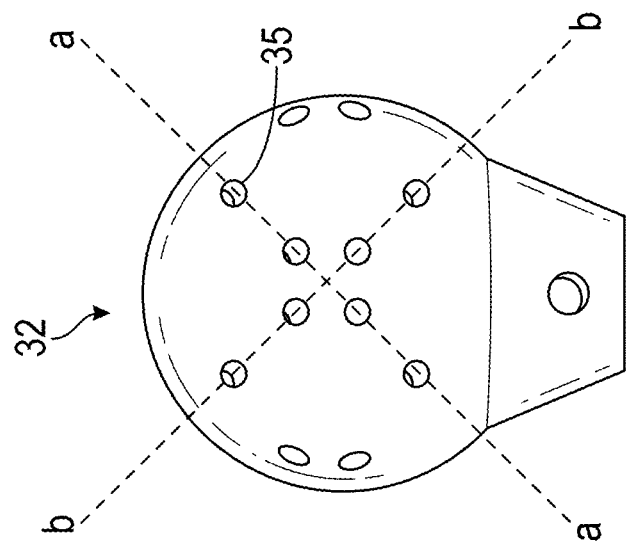
FIG. 8 is a side view of a semi-perforated perforated ball component of the shoulder joint according to another embodiment of the present disclosure.
Figure 7:
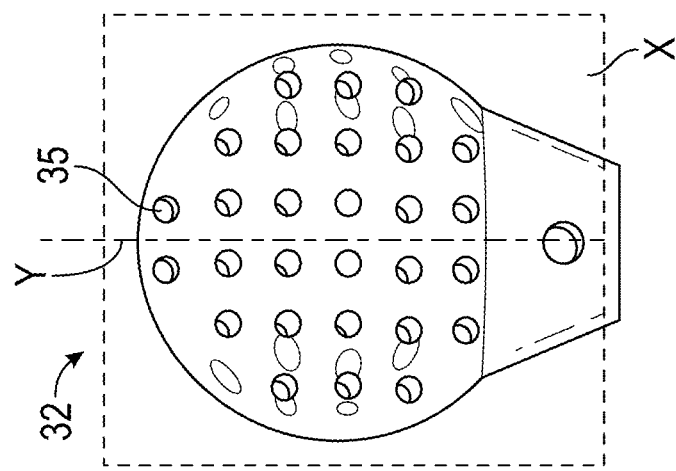
FIG. 7 is a side view of a perforated ball component of the shoulder joint according to one embodiment of the present disclosure.
Figure 10:
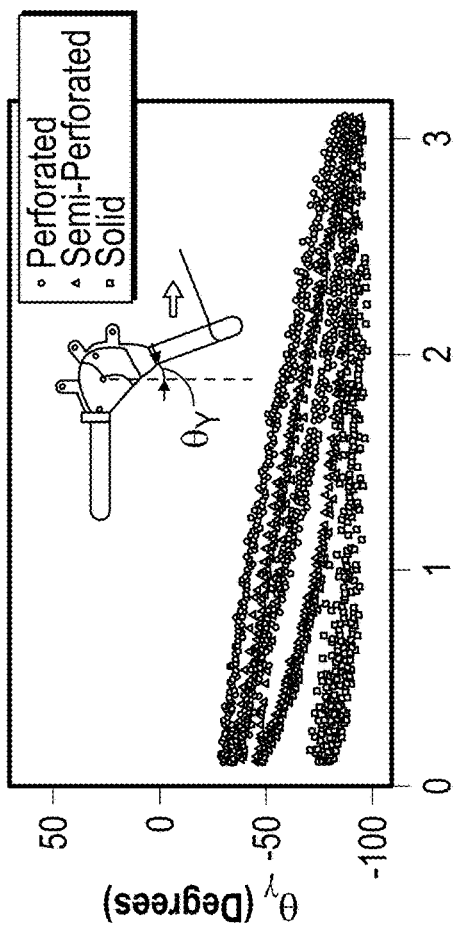
FIG. 10 is a plot of force measured as a function of an angle during closing of the shoulder joint according to the present disclosure.
Figure 11:
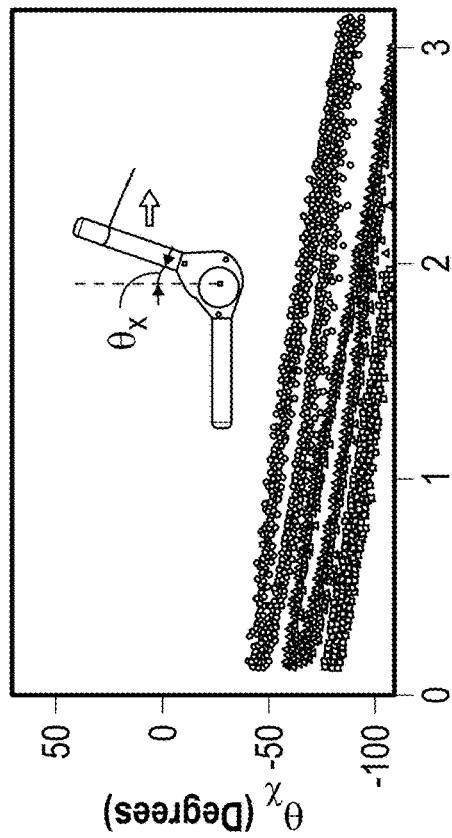
FIG. 11 is a plot of force measured as a function of an angle during opening of the shoulder joint according to the present disclosure.
Figure 12:
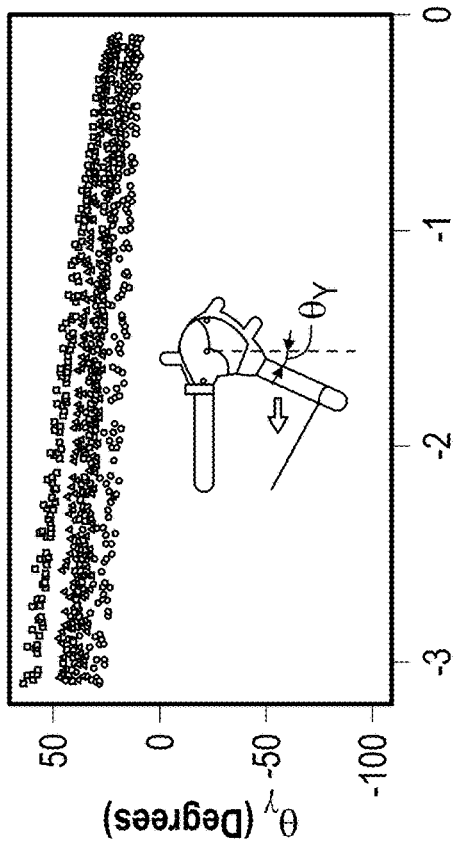
FIG. 12 is a plot of force measured as a function of an angle during closing of the elbow joint according to the present disclosure.
Figure 13:
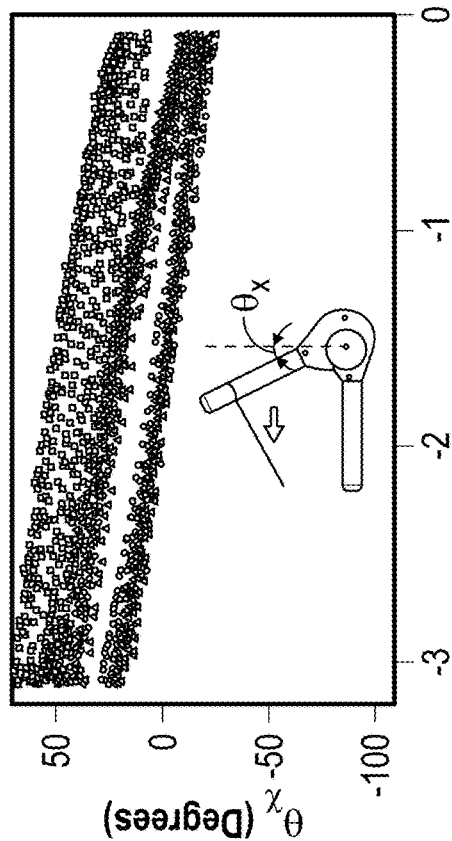
FIG. 13 is a plot of force measured as a function of an angle during opening of the elbow joint according to the present disclosure.

With reference to FIGS. 7-9, various embodiments of the components are shown with respect to the ball component 32. Same modifications may be made to other components and only the ball component 32 is described for the sake of brevity. As shown in FIG. 7, the ball component 32 includes through-holes 35 disposed in a square grid pattern such that the through-holes 35 and a distance therebetween covers the majority of the surface of the ball component 32. This pattern is denoted herein "perforated". As used herein, "through-holes" denotes a pair of holes that lie on the same longitudinal axis. In embodiments, where the joint components are solid, the through-holes may define a lumen through the component (i.e., ball components 22 and 32 and socket components 24 and 34).

Figure 4:
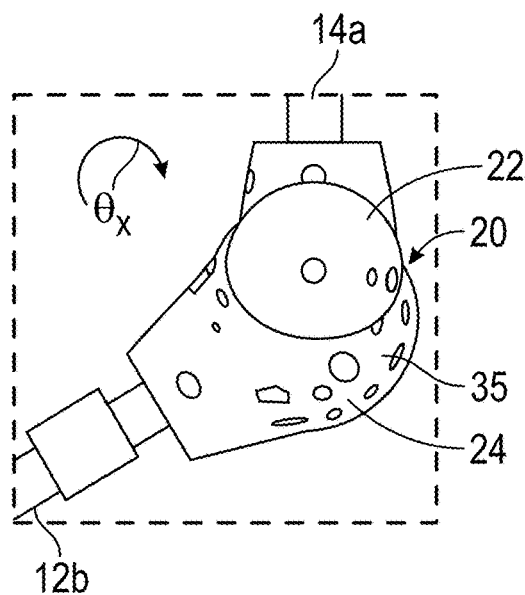
FIG. 4 is a side view of 3D model of the elbow joint according to the present disclosure.

In embodiments, the through-holes 35 may be disposed in any suitable pattern, such as rectangular, circular (concentric circles), and the like. The through-holes 35 may be disposed in a plurality of planes. As shown in FIG. 7, the through-holes 35 lie in two perpendicular planes, i.e., x and y planes, which are aligned with the axis of intended motion. In particular, the primary axes of rotation for the second joint 30 is the θy direction (FIG. 3), and the first joint 20 as the θx direction (FIG. 4).

With reference to FIG. 8, the ball component 32 includes through-holes 35 that are disposed in a "semi-perforated" pattern since there are fewer through-holes 35 than in the "perforated" pattern of FIG. 8. The through-holes 35 are disposed along diagonal axes "a-a" and "b-b" which lie on the x plane. Similarly, the through-holes 35 disposed on the y plane are disposed along corresponding diagonal axes (not shown.) FIG. 9 shows a solid ball component 32 that is devoid of any through holes. As noted above, each of the components may be hollow, including the solid ball component 32 of FIG. 9.

To form the joints 20 and 30 the ball components are cast in a flexible membrane 37, which is disposed over the ball components 22 and 32 and socket components 24 and 34. The membrane 37 may be formed from any suitable compliant, flexible, and elastic polymer, i.e., elastomers. Suitable elastomers include rubbers, such as natural rubbers, silicone rubbers ethylene propylene rubber, ethylene propylene diene rubber, and nitrile rubbers and synthetic elastomers such as styrene-butadienes, polyisoprenes, polybutadienes, polysiloxanes, fluoroelastomers, polyurethane elastomers, and the like. The ball components 22 and 32 and socket components 24 and 34 are joined together, such that the ball components 22 and 32 rotationally fits within their counterpart socket components 24 and 34 and the membrane 37 is applied thereto. The ball components 22 and 32 fit within their counterpart socket components 24 and 34, which are then placed within mold supports 39 (FIGS. 5 and 6) and the liquid precursor composition of the membrane 37 is poured into the mold supports 39 to form the membrane 37 after curing, which may be from about 15 minutes to about 5 hours, depending on the curing times of the polymer. In addition, the liquid composition penetrates the ball components 22 and 32 and the socket components 24 and 34 via the through-holes 35 as well as their interconnecting lumens. This allows the membrane 37 to encase the joints 20 and 30 and acts as connective tissue within the components of the joints 20 and 30. In further embodiments, the membrane 37 may be formed by casting, dipping, layering, calendaring, spraying, and combinations thereof.

Adjusting degree of perforation (i.e., number of through-holes 35 and lumens therebetween) the ball components 22 and 32 and socket components 24 and 34 changes the amount of negative (i.e., empty) space, leading to changes in the amount of the membrane 37 that penetrates the ball components 22 and 32 and socket components 24 and 34, which in turn, modulates dynamics of the joints 20 and 30. In particular, the combination of the membrane 37 surrounding the joints 20 and 30 and within the through-holes 35 creates a system of spring-dampers which can be modified by design parameters including hole quantity, outer-membrane width, and choice of flexible material used in forming the membrane 37. Thus, the joint dynamics may be adjusted by varying the quantity of through-holes 35 in the elastic membrane 37 of each joint. The through-holes 35 act as parallel spring-damper systems, effectively adjusting the non-linear dynamics.

The robotic arm 10 may be controlled using any suitable control methodologies including model-free methodologies such as a proportional-integral-derivative (PID) controller and the model-free reinforcement learning algorithm, such as soft actor critic (SAC) algorithm. The robotic arm 10 may also be controlled using model-based control techniques.

In order to generate a suitable control agent for controlling movement of the robotic arm 10, the robotic arm 10 may be modeled using spring-damper characterization, e.g., through force-deflection experiments as described in the "Examples" section. The sensors 15 as well as the sensors of the actuators 40 and 50 may be used to measure various parameters (e.g., force). These parameters along with dimensions of the robotic arm 10 may be used to generate a simulation of the robotic arm 10 (e.g., a MuJoCo simulator as described in the "Examples" section). The simulation of the robotic arm 10 may be used to train a control agent, which in embodiments may be machine learning algorithm as described in Example 4 below. Suitable machine learning algorithms include model-free reinforcement learning techniques such as Proximal Policy Optimization (PPO), Trust Region Policy Optimization (TRPO), Asynchronous Advantaged Actor Critic (A3C) and Soft Actor Critic (SAC).

The terms "artificial intelligence," "data models," or "machine learning" may include, but are not limited to, neural networks, convolutional neural networks (CNN), recurrent neural networks (RNN), generative adversarial networks (GAN), Bayesian Regression, Naive Bayes, nearest neighbors, least squares, means, and support vector regression, among other data science and artificial science techniques.

In various embodiments, the neural network may include a temporal convolutional network, with one or more fully connected layers, or a feed forward network. Training of the neural network may happen on a separate system, e.g., workstations with graphic processor unit ("GPU"), high performing computer clusters, etc., and the trained algorithm would then be deployed to a computer 100 (FIG. 1) controlling the robotic arm 10. The computer 100 may include any suitable processor (not shown) operably connected to a memory (not shown), which may include one or more of volatile, non-volatile, magnetic, optical, or electrical media, such as read-only memory (ROM), random access memory (RAM), electrically-erasable programmable ROM (EE-PROM), non-volatile RAM (NVRAM), or flash memory. The processor may be any suitable processor (e.g., control circuit) adapted to perform the operations, calculations, and/or set of instructions described in the present disclosure including, but not limited to, a hardware processor, a field programmable gate array (FPGA), a digital signal processor (DSP), a central processing unit (CPU), a microprocessor, and combinations thereof. Those skilled in the art will appreciate that the processor may be substituted for by using any logic processor (e.g., control circuit) adapted to execute algorithms, calculations, and/or set of instructions described herein.

The following Examples illustrate embodiments of the present disclosure. These Examples are intended to be illustrative only and are not intended to limit the scope of the present disclosure.

Example 1

This Example describes construction of an exemplary robotic arm according to the present disclosure.

Carbon fiber rods with a 13 mm outer diameter were used as artificial bones linking the joints as shown in FIG. 1. EcoFlex 00-50 (Smooth-On), was used as the passive elastic component due to its ability to deform, and its usage in fabricating soft robots (53-55) having tensile strength of 315 psi, 12 psi 100% modulus, and 980% elongation at break.

Figure 5:
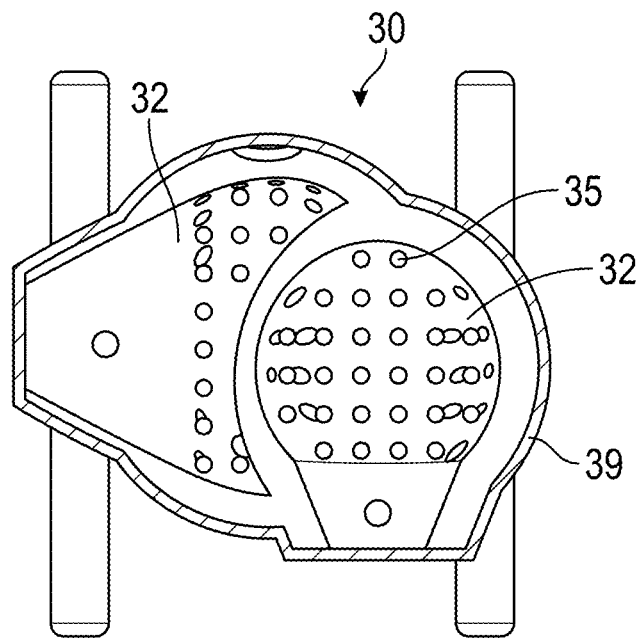
FIG. 5 is a partial, cross-sectional view of the shoulder joint according to the present disclosure.
Figure 6:
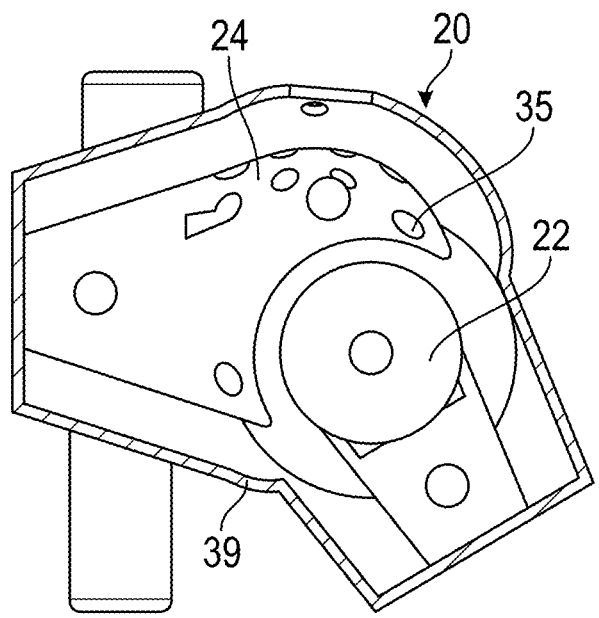
FIG. 6 is a partial, cross-sectional view of the elbow joint according to the present disclosure.

Polylactic acid (PLA) was used for the rigid components of the joints, motor-mounts, sensor-mounts, and cable routing. Three types of joints were prepared—perforated, semi-perforated, and solid. The computer-aided design (CAD) modeled joints and mold designs were printed with a Prusa i3 MK3 3D printer. Once inserted on the mold supports as seen in FIGS. 5 and 6, the mold was sealed with an easily removable adhesive such as hot glue. After mixing a 1:1 ratio of Ecoflex-50, the silicone material was poured into the mold and is left to cure for approximately 3 hours. The final product is shown in FIG. 1: a hybrid joint containing rigid components housed within a soft silicone mesh.

BNO55 IMU sensors were used to measure operating parameters of the robotic arm. The IC BNO55 IMU sensor includes a built-in sensor fusion that allows for a 100 Hz sampling rate, returning the axis angles: roll, pitch, and yaw. 12V DC motors with 4.2 kg/cm were used as actuators. A custom PCB was designed to interface with the electronics and communicate with a desktop computer using I2C serial communication. In order to simulate and process large amounts of data, a PC with an Intel Core i7-9700 K processor was used to speed up training time.

The motor mounts were attached to the carbon fiber rods at roughly the location of the major muscles of a human arm. The cables acting on the carbon fiber rods transmit a force similar to tendons pulling on bones. The biceps brachialis flexes the elbow joint—increasing $\theta x$ as denoted in FIG. 4—and thus the corresponding motor mount is placed on the upper arm with the cable connecting to the lower arm. The medial deltoid is the prime mover for shoulder abduction, which is seen as positively increasing $\theta y$ denoted in FIG. 3. Accordingly, the second motor mount is located to simulate the force created by the medial deltoid. Together the placement gives the ability of shoulder abduction $\theta y$ and biceps flexion $\theta x$.

When directly wrapping the cables around the shoulder joint, the forces required to cause movement were too large for the chosen motors due to the angle of attack—which is created by the cable attaching the shoulder's motor and the upper-arm—is too small to transmit the necessary forces.

Another issue stemming from the cable wrapping around the joint was that it can lose its pathing, falling to either side of the joint rather than tracing the desired route. Routing blocks were used to route the cable for the shoulder joint as shown in FIG. 3. Bearings were attached for less cable friction. Within Autodesk Inventor, the measured angle of attack before was θa=59.1° and after adding the cable routing was measured as θb=22.5°. Thus Ft=Fmotdcos(θ) calculates the transfer force Ft from the motor force Fm. The chosen cable routing offers about 1.8 times more force.

Example 2

This Example describes simulation modeling and evaluation of the exemplary robotic arms of Example 1.

The setup of the spring experiment involved anchoring each joint with the proximal portion meeting a rigid testbed and the distal end attaching to a single rod with an IMU. Force was measured through a calibrated load cell, which records simultaneously alongside the IMU. Forces were applied perpendicular to the joint angle, as depicted in FIGS. 10-13, which show opening and closing plots for both joints, in a quasistatic manner. More than 10 repeated trials were run for both directions of each of the shoulder and elbow joints. The starting angles were determined by the resting point after the first trial which was removed from the data.

The torsional spring coefficients were characterized through force-deflection experiments shown in plots of FIGS. 10-13. Each joint was anchored to the testbed by the proximal end of the link, and an IMU was attached distally. The experiments of joint opening seen in FIGS. 10 and 12 has the data circling counterclockwise while joint closing seen in FIGS. 11 and 13 circles clockwise in time. The data shows that increasing the number of holes—which increases the aggregate cross-sectional surface area of the rubber—requires more force to get to the same angular displacement during joint opening. The results are less clear during joint closing. The force required to close the joint depends on both the volume of silicone material within the through-holes and external membrane thickness surrounding the rigid components. In the plots of FIGS. 10-13 the number of through-holes in each of the perforated, semi-perforated, and solid joints are easily distinguishable as a function of the angle and force used to open/close the joint. The graphs appear discontinuous at 0 N due to mechanical hysteresis and slipping within the joint. Hysteresis in FIGS. 10-13 represents graphically as a belly and demonstrates non-linearities; different forces are required depending on the directionality of joint movement. This characterization supports our need for data-driven non-linear estimators.

Damping experiments were conducted using a drop-test. The resulting oscillations are shown in FIGS. 14 and 16, which were characterized by fitting an exponential decay equation to the positive peaks of the data. These experiments provide more evidence that varying the design allows for control over dynamic parameters.

For the damping experiments the proximal side of the joint was attached to the testbed while the distal portion of the joint connected to the rest of the arm. In the case of the shoulder this includes the upper arm, lower arm, elbow joint and mounted parts. For the elbow, the experiment only included the lower arm. Each joint was displaced by around 75° and released. Data was cropped at the peak of the first oscillation to align the separate trials. The motion after the first peak is shown in FIGS. 14 and 16. The envelopes of the peaks were used to fit the exponential decay equation to the data. This resulted in the time constant τ. The damped angular frequency $\omega_d$ was calculated from the inter-peak times resulting in the necessary parameters for modeling.

Characterization of the robotic arms dynamics provided insights and analysis which helped build more accurate models and control schemes. From these experiments and the calculations in "Modeling spring-damper", the time constant τ and the damping ratio ζ were acquired to parameterize both an ideal second order spring-damper and the MuJoCo simulator. The ideal equation was used to validate MuJoCo. Both approaches were compared to the experimental data in FIGS. 15 and 17. The nonlinearities emerge as differing resonant frequencies between the initial high-amplitude transient and the tail. A small time shift of 4 ms was utilized to align with the tail since it is closer to the small-deviation linear dynamics. These modeling results provide a sufficiently accurate foundation for experimenting with control strategies—specifically reinforcement learning algorithms—in simulation.

The robotic arm was simplified as a revolute joint for each corresponding actuated axis. Each joint was modeled as a torsional spring-damper system. The ideal equation for a damped harmonic oscillator is shown in formula (1) below:

$$y = ae^{-t/\tau} \cos(\omega_d t) \tag{1}$$

where ωd is the damped angular frequency and τ is the time constant. The relation between the damped angular frequency and the natural frequency of the system follows from $\omega_d = \omega_n \sqrt{1-\zeta^2}$. The natural frequency ωn can be found using $\omega_n = 1/(\zeta\tau)$. Finally, solving for results in formula (2):

$$\zeta = \frac{1}{\sqrt{(\tau\omega_d)^2 + 1}} \tag{2}$$

These equations result in the ideal characterization which is shown on the right in FIGS. 15 and 17 for shoulder and elbow joints, respectively, alongside the experimental data and MuJoCo model.

MuJoCo is a multi joint rigid body simulator specializing in robotics and biomechanics which uses different solvers to compute forward and inverse dynamics and kinematics. MuJoCo is highly optimized, having higher relative speeds for robotic-like tasks while maintaining the top precision compared to other popular simulators (other than in the case of many disjoint bodies). MuJoCo also has been used for designing environments for reinforcement learning experimentation through OpenAI Gym. Rigid bodies can be created or imported, assigned material properties, and actuated around specified joints. Internal parameters can be set to manipulate joint and actuator dynamics. In order to mirror the physical robot, the 3D models of the robotic arms of Example 1 were imported into MuJoCo. The weights of each piece were set, along with the parameters τ and ζ for the spring-damper system. The resulting graphs validating the accuracy of MuJoCo are shown in FIGS. 15 and 17, comparing the plots of drop tests with ideal and simulated (MuJoCo) plots.

Example 3

This Example describes PID control algorithm for controlling the exemplary robotic arms of Example 1.

The PID control algorithm was adjusted using the robotic arm with perforated joints. The control function evaluated is shown in formula (3):

$$u(t) = Kpe(t) + Ki \int_O^T e(t)dt \, Kd\frac{de(t)}{dt} \quad (3)$$

where u(t) is the control value output, KP is the proportional term, KI is the integrator term, KD is the derivative term, and e(t) is the error for the time-step t.

To tune the controller, a grid search was used to test 300 different values for the shoulder and elbow joint. MSE was calculated using formula (4):

$$MSE = \frac{1}{T}\sum_{t=0}^{T}(yt - \hat{yt})^2 \quad (4)$$

with T as the total time-steps, yt as the measured value, and ŷt as the goal value. MSE was used to determine the parameters resulting in the minimum error to a desired set point, formalized using formula (5):

$$(K_P, K_I, K_D) = \arg\frac{\min}{K_P, K_I, K_d} MSE(K_P, K_I, K_D) \quad (5)$$

Figure 28:
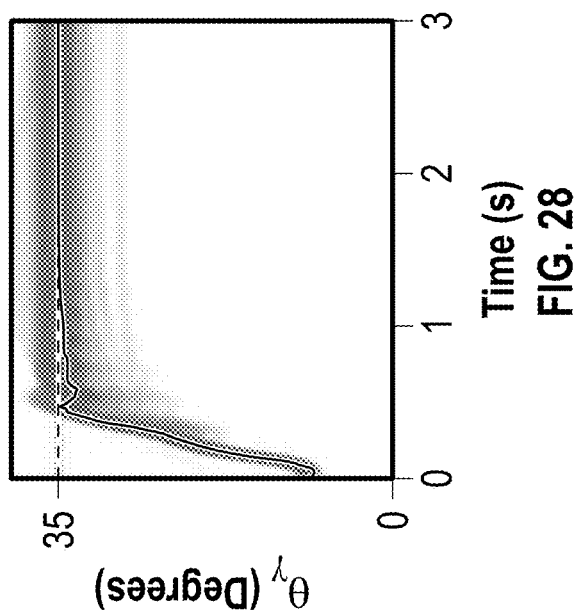
FIG. 28 shows a tuning plot for reaching an angle of about 35° using a PID control algorithm for the shoulder joint.
Figure 29:
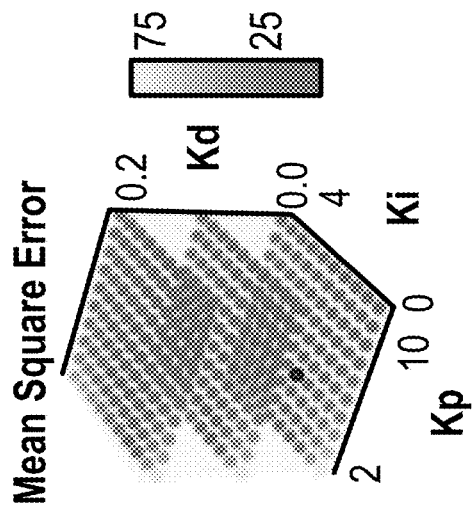
FIG. 29 shows a 3D visualization grid search values for the shoulder joint for each of the $K_P$, $K_I$, and $K_D$ parameters of the PID control algorithm according to the present disclosure.
Figure 30:
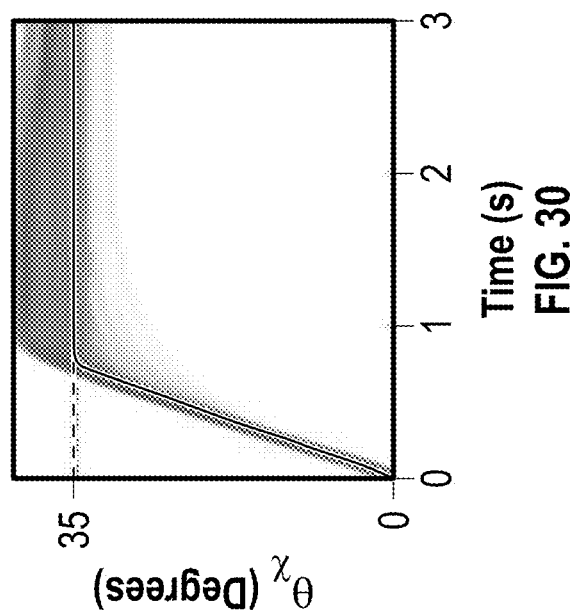
FIG. 30 shows a tuning plot for reaching an angle of about 35° using a PID control algorithm for the elbow joint.
Figure 31:
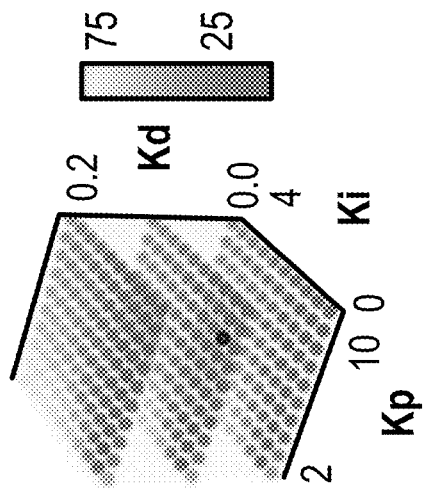
FIG. 31 shows a 3D visualization grid search values for the elbow joint for each of the $K_P$, $K_I$, and $K_D$ parameters of the PID control algorithm according to the present disclosure.

The ranges for the grid search were chosen based off preliminary hand-tuning, and used ten $K_P$ values, ten $K_I$ values and three $K_D$ values (since the derivative term is often dropped). The results are shown in FIGS. 28-31 and Table 1. A grid search over 300 parameter combinations was used to tune the PID controller. Each trial involved reaching the set point of 35° which resides near the center of the workspace. FIGS. 28 and 30 show each trial of the grid, with a highlighted line showing the best result for the shoulder and elbow joints, respectively. FIGS. 29 and 31 show a 3D visualization of grid search values for the shoulder joint (FIG. 29) and elbow joint (FIG. 31) over $K_P$, $K_I$ and $K_D$ parameters, with the best value being marked. MSE values are shown on a side bar. The values in Table 1 display the results, showing that the elbow joint mainly needed the proportional term while the shoulder joint requires a sufficiently large integral term.

TABLE 1 tuned PID parameters

| Parameter | Search Range | Shoulder Best | Elbow Best |
|---|---|---|---|
| $K_P$ | [2, 12] | 5.3 | 9.8 |
| $K_I$ | [0, 4] | 1.7 | .4 |
| $K_D$ | [0, .2] | 0 | .1 |

The KP, KI, and KD terms of the PID controller were fit to minimize the MSE as described above.

Example 4

This Example describes a reinforcement learning algorithm used in controlling the exemplary robotic arms of Example 1.

The reinforcement learning control algorithm was adjusted using the robotic arm with perforated joints. The SAC agent was trained in simulation, using a grid search to select hyper-parameters, followed by transfer of the robot skills acquired in simulation to the real robotic system and then fine-tuning the agent on the physical robot. Physical training for the SAC agent occurred only for the perforated joint design on one task (i.e., increasing steps). The SAC agent was subsequently retrained to correct for some errors. The SAC-retrained agent appears in the case of the sinewave task and was fine-tuned on the task to account for the distinct goal dynamics.

The reinforcement learning problem was defined as maximizing the total discounted future reward in formula (6)

$$R_t = \sum_{k=0}^{\infty} \gamma^k r_{t+k} \quad (6)$$

where γ is a discount factor and rt is the reward given at time-step t. At each time-step, the agent used a policy π(st)=at to select an action at based on the current state st. The state is iterated forward and yields the reward via (st+1, rt)=ƒ(st, at) based on the environment dynamics given by function ƒ. The reinforcement learning algorithm attempts to find the optimal policy, π*(st)=at, which returns the action that maximizes Rt.

The value function of a state was defined by a formula (7) below:

$$V(s) = \mathbb{E}(Rt|st=s) \quad (7)$$

while the action-value function was defined as a formula (8) below:

$$Q(s,a) = \mathbb{E}(Rt|st=s, at=a), \quad (8)$$

where the probability distributions of actions are yielded from π(s). Actor Critic algorithms are built to parameterize estimators for the value and policy functions. For the deep reinforcement learning variant, the estimators used were feed-forward neural networks.

Model-free reinforcement learning techniques such as Proximal Policy Optimization (PPO), Trust Region Policy Optimization (TRPO), Asynchronous Advantaged Actor Critic (A3C) and Soft Actor Critic (SAC) have the capacity to accomplish control tasks in both simulated and physical robotic control tasks. SAC is a sample-efficient and stable reinforcement learning algorithm which follows policy gradient methods, enabling use on continuous action spaces. An entropy maximization formulation encourages exploration and results in a policy that is not overly sensitive to hyper-parameters, making it a prime candidate for the robotic arms of Example 1.

SAC increases sample efficiency and stability of the training process by increased exploration through rewarding actions that result in higher variance of the policy. This is given by the policy that solves the maximum entropy objective represented in formula (9):

$$\pi^* = \operatorname{argmax}_\pi \mathbb{E}_\pi\left[\sum_{t=0}^{\infty} \gamma(r_t + \alpha\mathcal{H}(\pi(\cdot|s_t)))\right] \quad (9)$$

where the expected value of $\mathcal{H}$ defines the entropy of the policy given the current state, and a is a temperature term that scales the impact of the entropy. The entropy term $\mathcal{H}$ is calculated as log π(at|st). Feed-forward neural networks are optimized to minimize the objective functions for the value, Q-value, and policy functions. The corresponding objective functions are listed in formulas (10)-(12), which are alternately minimized until convergence.

$$J_V = \mathbb{E}_{a_t}[½(V(s_t) - \mathbb{E}_{a_t \sim \pi}[Q(s_t,a_t) - \log \pi(a_t|s_t)])^2] \quad (10)$$

$$J_Q = \mathbb{E}_{s_t,a_t}[½(Q(s_t,a_t) - (r(s_t,a_t) + \gamma\mathbb{E}_{s_{t+1}}[V(s_{t+1})]))^2] \quad (11)$$

$$J_V = \mathbb{E}_{s_t}[\mathbb{E}_{a_t}[\alpha \log(\pi(a_t|s_t)) - Q(s_t,a_t)]] \quad (12)$$

Two environments were created to act in parallel, one with the physical robotic arm of Example 1 and one robotic arm created in a MuJoCo simulation as described above in Example 2. An OpenAI gym (available at https://gym.openai.com/) template was expanded to include the custom MuJoCo environment. This allows an agent to receive an observation from an environment, compute, and return an action. The environment can then simulate forward dynamics based on the action, which continued until the task is finished.

SAC was chosen as the algorithm to update network weights; the network architecture plays roles in the computational capability. Goal-conditioned algorithms allow for accomplishing a variety of tasks through policies that depend on specific goal inputs. Thus, goal-conditioned algorithms may be formulated similarly to controllers that require set points. Since there are delays in the hardware from sensing, communication to the main computer, and other unaccounted for attributes, the current state is non-Markovian. To computationally alleviate this issue, the ten previous observations were included. Both the simulation and physical prototype have a sampling rate of 100 Hz, permitting the history to account for 10 ms delays. One single observation (not including history) contains joint angles $\theta_x$, $\theta_y$ recorded from the IMUs, joint velocities $\omega_x$, $\omega_y$ calculated from the angles, previous action $a_{t-1}$, and the goal joint angles g.

The fidelity of the MuJoCo simulation provided an efficient way to experiment with network hyper-parameters. Multiple hyper-parameter searches were performed to identify efficient learning rate values, quantity of layers, layer sizes, and activation functions. One parameter was varied while the others were held constant, alternating until sufficient values were found. After agents with the varied parameters underwent a training period, mean episode reward was used to determine the best performing hyper-parameters. This process iterated until the mean episodic reward stopped increasing. The final chosen hyper-parameters include dense layers of sizes with ReLU activation functions. Decaying learning-rates $\alpha_d$ outperformed constant learning rates following $\alpha_d(t)=\alpha t/T$ where $\alpha$ is the initial learning rate, t is the current episode, and T is the total number of episodes. The initial learning rate was chosen as $\alpha=0.001$.

The reward function was incrementally adapted through observation both in MuJoCo and on the physical robot. The final terms for the reward include the distance reward rd and the velocity reward rv. The calculation of reward was done using formulas (13)-(15):

$$r_d = -(\sqrt{|\theta_x| + |\theta_y|}) \quad (13)$$

$$r_w = -(\sqrt{|\omega_x| + |\omega_y|}) \quad (14)$$

$$r_t = c_1 r_d + c_2 r_w \quad (15)$$

The square roots were used since the gradients for updating became increasingly small when the reward was small. This removed a problem of oscillation around the target goal when velocities were very small, yet the distances were still significant. The constants c1 and c2 are weights of the distance and velocity respectively which can help avoid sub-optimal policies—such as a policy which does not move, in order to always minimize velocity. This reward shaping created a dense reward function which trains the agent to minimize distance and reduce action output since the motors hold their position with a control value of 0.

Figure 18:
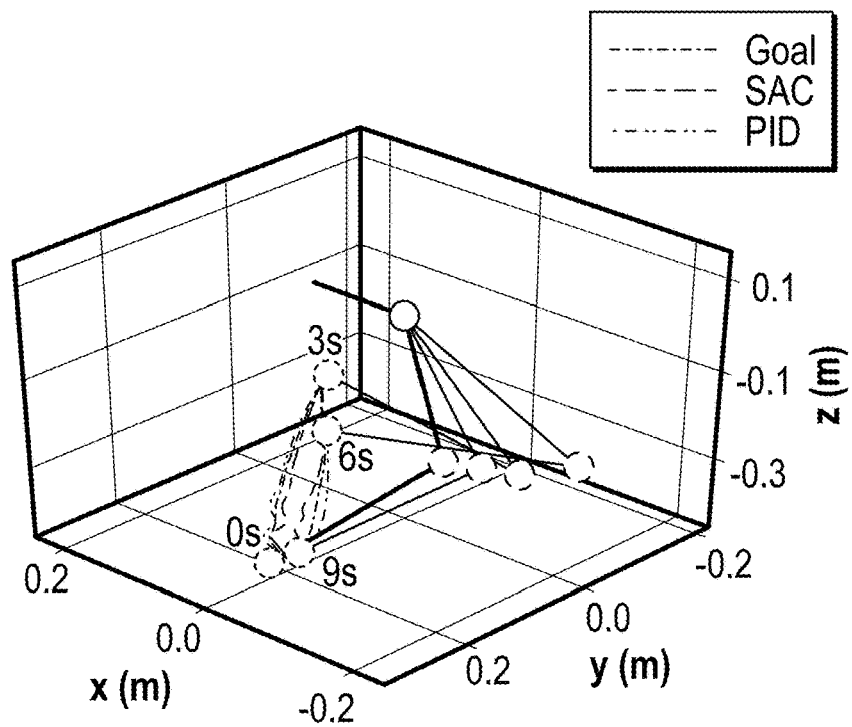
FIG. 18 shows a 3D visualization of an end effector trajectory moved by a robotic arm according to the present disclosure.
Figure 19:
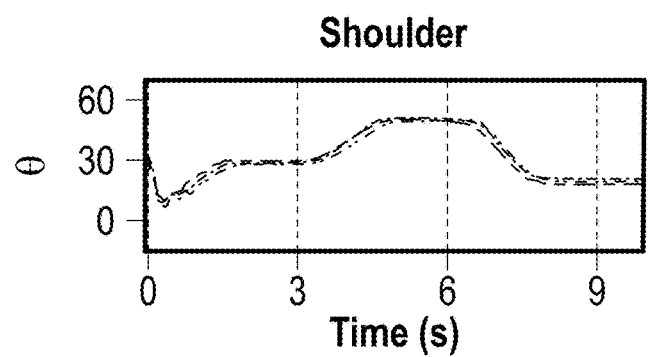
FIG. 19 shows a plot of an angle of the shoulder joint as a function of time of the robotic arm moving the end effector of FIG. 18.
Figure 20:
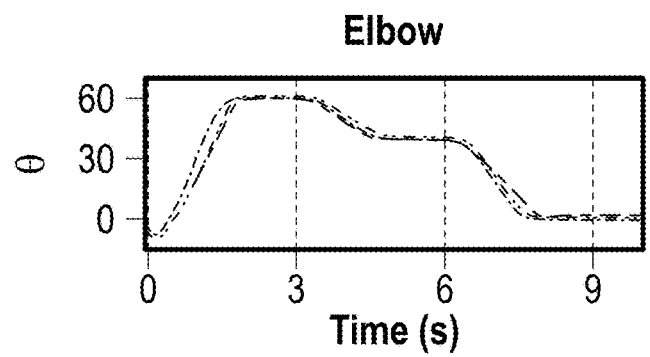
FIG. 20 shows a plot of an angle of the elbow joint as a function of time of the robotic arm moving the end effector of FIG. 18.

Three separate tasks were selected to test the effectiveness of the SAC and PID algorithms controlling the robotic arm. Each algorithm receives the current state and goal state as inputs and produces control values for each motor, attempting to match its joint angles and velocities to the proposed goal. FIG. 18 shows a 3D visualization of the end effector's trajectory with its corresponding joint angles, with FIGS. 19 and 20 show angles of the shoulder and elbow joints respectively through the movement of FIG. 19.

Figure 21:
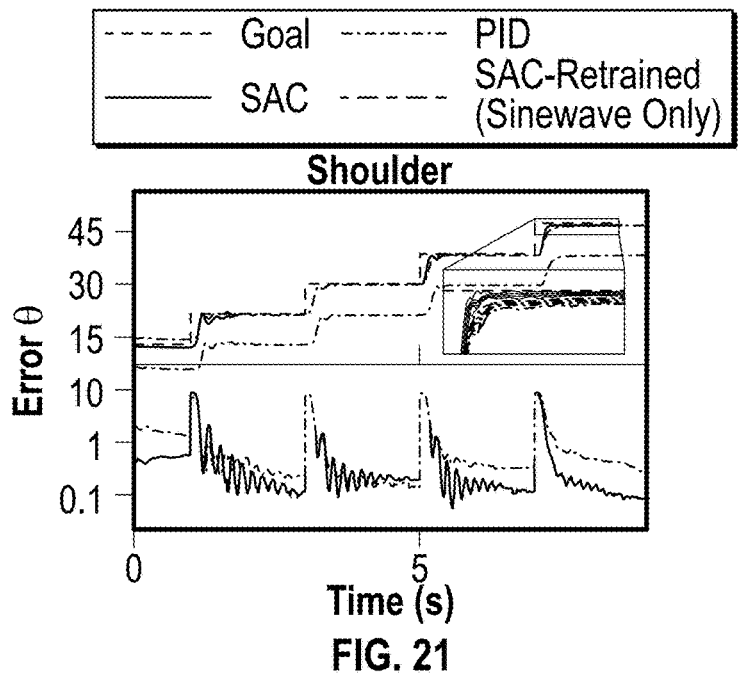
FIG. 21 shows plots of a measured angle of the shoulder joint while performing an increasing steps maneuver using a SAC algorithm and a PID algorithm and the resulting error for each.
Figure 22:
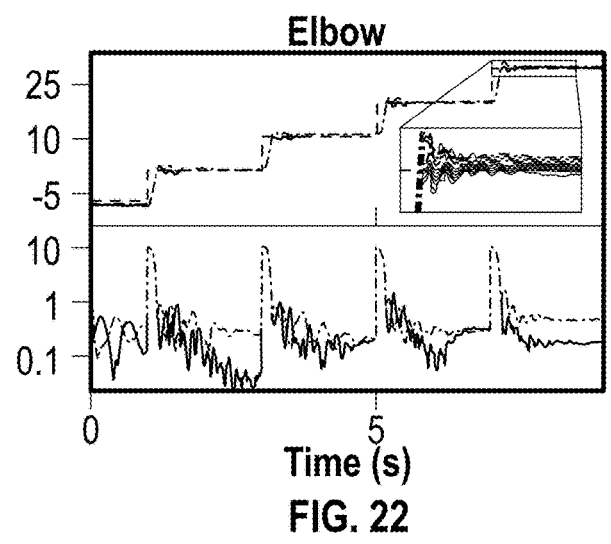
FIG. 22 shows plots of a measured angle of the elbow joint while performing an increasing steps maneuver using a SAC algorithm and a PID algorithm and the resulting error for each.
Figure 23:
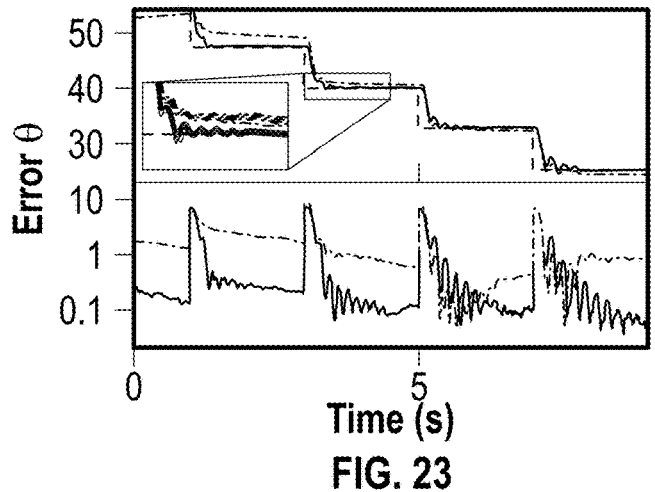
FIG. 23 shows plots of a measured angle of the shoulder joint while performing a decreasing steps maneuver using a SAC algorithm and a PID algorithm and the resulting error for each.
Figure 24:
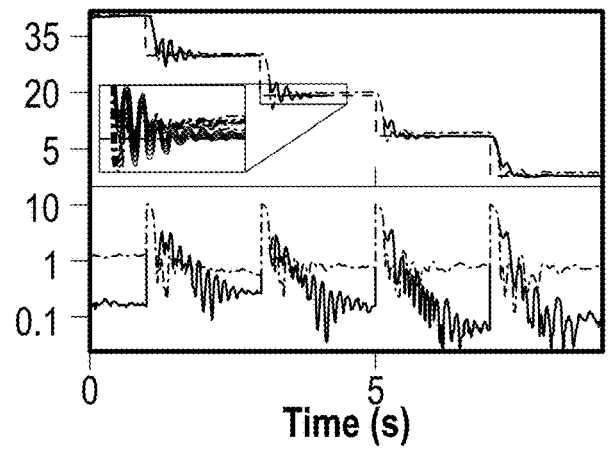
FIG. 24 shows plots of a measured angle of the elbow joint while performing a decreasing steps maneuver using a SAC algorithm and a PID algorithm and the resulting error for each.
Figure 25:
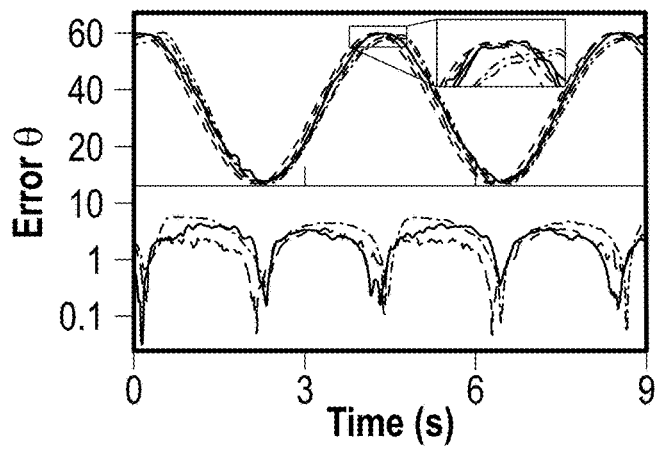
FIGS. 25 and 26 show goal (ideal) plots of a measured angle of the shoulder joint while performing a sine wave maneuver along with plots using a SAC algorithm, a PID algorithm, a retrained SAC algorithm and the resulting error for each.
Figure 26:
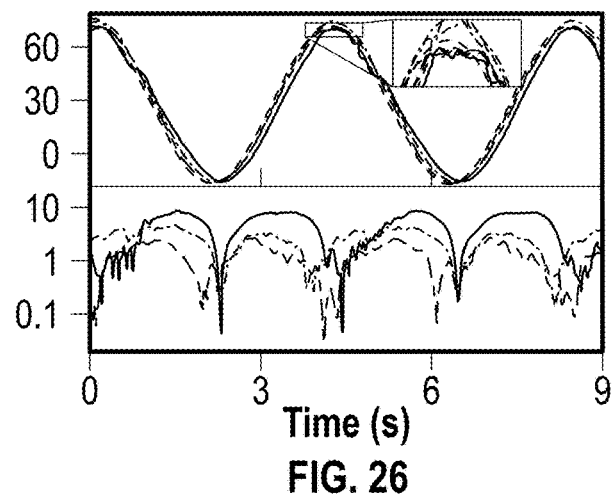

As shown in FIGS. 21-26, these physical tasks included the arm following (a) increasing steps (FIGS. 21 and 22), (b) decreasing steps (FIGS. 23 and 24), and (c) sinewave trajectories (FIGS. 25 and 26). Evaluation of control algorithms on three separate tasks were performed with the shoulder joint (FIGS. 21, 23, and 25) and elbow joint (FIGS. 22, 24, and 26). The goal and experimental trajectories of multiple trials are shown on top, while each the corresponding mean error is shown on bottom. Increasing steps task were used to train SAC, which is most similar to the PID tuning task. Decreasing steps task highlighted asymmetry of joint dynamics. Sinewave task including a SAC-retrained agent that has been fine-tuned to properly capture dynamic goals.

These experiments were used to determine the ability of both control algorithms to handle smooth and discrete goal-position changes while compensating for gravity, mechanical hysteresis, and other non-linearities. Both joints were evaluated simultaneously, thus errors are dependent on each other. However, it was assumed the measurements are disentangled due to the orthogonality of the actuated axes.

To see how well each model adapted to new, unfamiliar static and dynamic tasks, the SAC algorithm was trained and the PID controller was tuned on a static task (increasing steps) shown in FIGS. 21 and 22. For the dynamic sinewave task, a decrease in SAC performance was resolved with a brief retraining period that compensated for the unencountered domain. The PID controller did not require re-tuning because it was tuned about a single point within the range of motion and does not differentiate between static and dynamic tasks.

In order to train the agent sufficiently, the MuJoCo simulation was used to reduce real-world training time. The training task involved reaching to random points in the state space repeatedly. The most successful agent through training in simulation was transferred and fine-tuned on the physical robot. The physical training task was initially limited to an increasing steps task (FIGS. 21 and 22) in order to assess generalization. For the sinewave task, fine-tuning of the agent was done by training on increasing steps by briefly continuing training on the new task. Fine-tuning may be used for different joint types, tasks, or simply anything changing the problem while maintaining sufficient similarity.

Overall, the SAC agent showed lower error for both the elbow and shoulder joints during the increasing steps task (FIG. 21). The PID controller was only able to perform comparably when operating near the position the control coefficients were tuned for (35°), otherwise having higher errors. The PID controller performs worse on the shoulder joint than the elbow, likely due to uncompensated gravitational forces and the bidirectional mechanical hysteresis depicted in FIGS. 12 and 13. In contrast, the SAC agent performs consistently throughout each joint's entire range of motion, indicating that the system's transient dynamics have been characterized by the policy network.

FIG. 23 shows the decreasing steps task, where the SAC agent continued to generalize well. The PID controller failed to minimize the steady state error throughout the range of the experiment, and performs better on the elbow joint compared to the shoulder joint indicating that the elbow is a simpler control task. In both cases, SAC kept reducing in error and the PID controller does not.

In FIG. 25, the shape of the error graph (bottom portion) shows a "bouncing" behavior, where the minimal error points represent the time where the true position crosses over the goal trajectory. The PID generalized better than the original SAC for the elbow joint and comparably for the shoulder, explained by its inability to distinguish between task types and more direct control of the elbow. It was observed that the original SAC algorithm had larger error magnitudes. Since the task involved a dynamic trajectory rather than static goal positions, a retrained version of the same algorithm was tested to see if performance improved. The SAC-retrained agent performed significantly better, outperforming the other control methods.

Error analysis for the SAC and PID algorithms was applied to each joint design. "Shoulder" and "elbow" indicate which physical joint corresponds with the error signal. "Combined" refers to the summation of the shoulder and elbow errors. The background shading of each plot indicates the best performer. The SAC agents outperform the PID controller when considering each combined error. Although SAC does not generalize to the sine wave as well, the SAC-retained algorithm was able to perform best for each joint design. Since all algorithms were fit to the Perforated design, performance generally decreases for the other designs along with larger oscillations.

Figure 27:
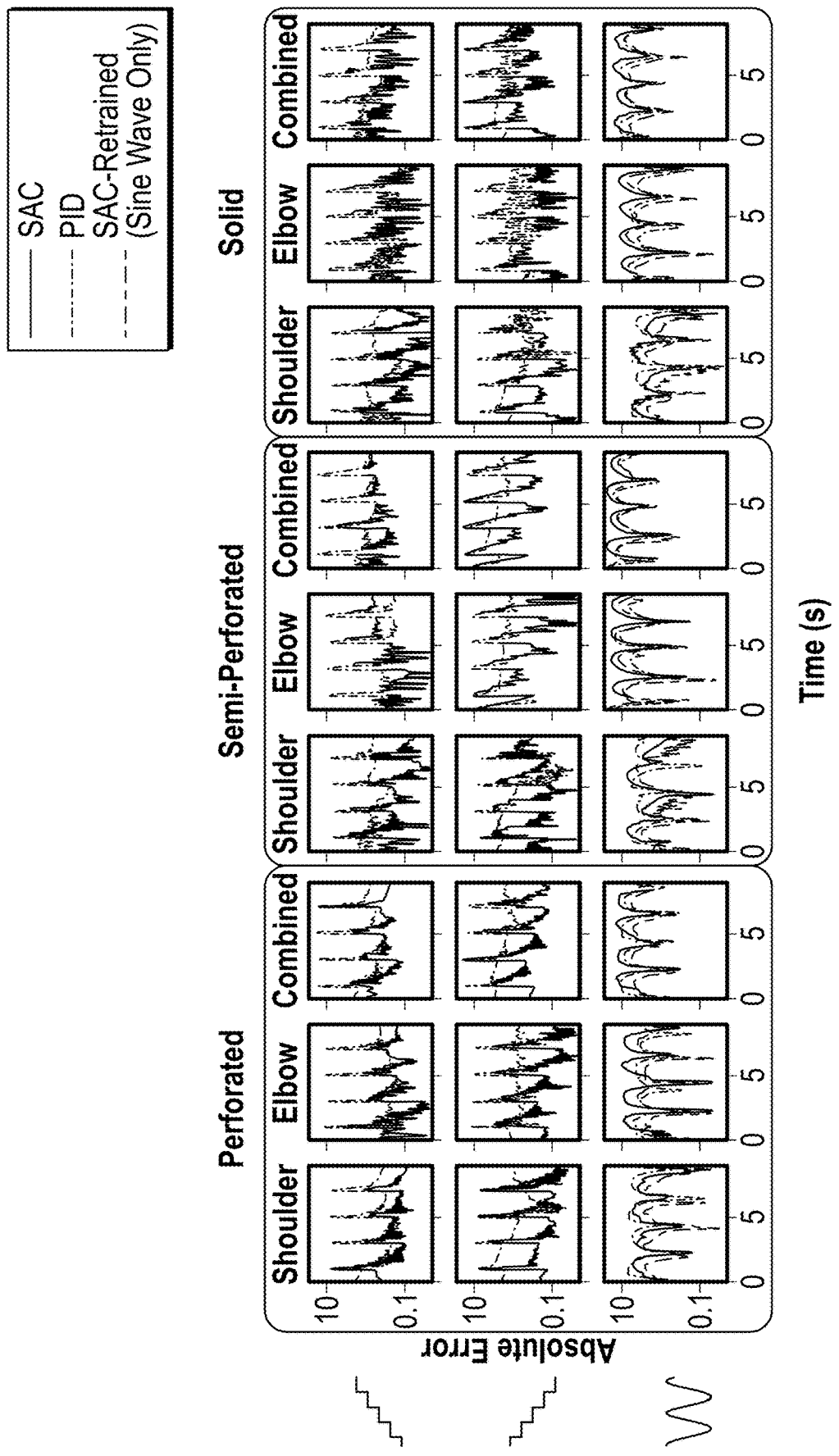
FIG. 27 shows absolute error plots as a function of time for each of three types of joint components, for each of the shoulder joint, the elbow joint, and the robotic arm, performing three motions (increasing steps, decreasing steps, and sinus wave)

Absolute errors of each joint design when undergoing these selected tasks were compared. FIG. 27 shows the error signal of the three trials for each task. The errors are separated by task (increasing steps, decreasing steps, sinewave), joint design (perforated, semi-perforated, solid), and error signal (shoulder, elbow, combined).

It was observed that the best performing controllers per experiment using the background shading in FIG. 27, determined by the absolute error summed through time. Overall, the SAC agents perform best in 23/27 cases compared to the PID controller. The results are shown in Table 2. For the most important measurement—the Combined error—SAC outperforms PID control in 9/9 cases. Note that the SAC results include the SAC-retrained.

TABLE 2

Average combined shoulder and elbow error per sample

| Task | Design | PID error (°) | SAC error (°) | SAC-r error (°) |
|---|---|---|---|---|
| Increasing steps | Perforated | 1.90 | 1.55 | N/A |
| | Semi-perforated | 2.30 | 2.27 | N/A |
| | Solid | 2.23 | 2.06 | N/A |
| Decreasing steps | Perforated | 2.95 | 1.76 | N/A |
| | Semi-perforated | 4.39 | 3.85 | N/A |
| | Solid | 3.11 | 2.63 | N/A |
| Sinewave | Perforated | 6.77 | 7.84 | 3.54 |
| | Semi-perforated | 9.26 | 14.44 | 8.79 |
| | Solid | 6.52 | 9.23 | 4.83 |

General trends indicate that SAC decreases the amplitude of the error oscillations, lowering the steady-state error through time in the static tasks (top 2 rows of FIG. 27). Interestingly, the PID control performed best solely with the elbow joint on the sinewave and decreasing steps tasks. In both cases, SAC performs significantly better in the paired shoulder measure, coinciding with how the RL reward function accounts for the sum of both joint errors. Thus, the SAC controller outperformed a PID controller and generalized well through differing physical properties and goal trajectories. Retraining the SAC agent solved a new type of task which also generalized between joint designs.

The present disclosure provides for a novel method of designing flexible robotic joints, where elastic ligament meshes interweave traditional robotic joints to introduce compliance while maintaining stability. This novel class of robotic joints was used to construct a humanoid arm, demonstrating how the ligament mesh design can be manipulated to adjust dynamic characteristics; thus, three designs were constructed. Robotic joint components (i.e., ball-and-socket and hinge joint components) and molds were designed to accommodate ligaments and 3D printed with negative space to cast a surrounding and interweaving elastic membrane. The simple casting process allows for rapid, low-cost prototyping, opening an avenue for creating systems with dynamic properties through simple mechanical modifications in 3D CAD. The variable nature of this system was accounted for through model-free controllers which successfully control the manipulator across joint designs and tasks.

Due to both the nonlinearities and variability in fabrication and design parameters, this disclosure compared two model-free control algorithms: the SAC reinforcement learning algorithm and a PID controller. The PID parameters were chosen through a grid search optimizing for MSE values. Since RL algorithms require large training times, a simulation was used to determine the SAC architecture through a grid search of hand-picked network hyper-parameters including learning rate, hidden layer quantity, hidden layer size, and activation function. The best simulated agent was transferred to the physical robot and trained on a single task, drastically reducing training time on the robot.

Requisite robot training hours were replaced with simulation training (e.g., training a model which generalizes with varied dynamic properties) and subsequent transfer of the robot skills acquired in simulation to the real robotic system. The SAC algorithm was only trained on one joint design (i.e., perforated) and one task (i.e., increasing steps), yet generalizes well to each experiment involving static goal positions. Fine-tuning the agent on the dynamic task (i.e., sinewave) took little time and generalized for each joint design. Examining the performance of the manipulator built from each joint design (i.e., perforated, semi-perforated, solid) through each task (i.e., increasing steps, decreasing steps, sinewave) shows that SAC outperforms the PID controller (FIG. 27).

Overall, the differences are evident between the two control methodologies. Although the PID controller achieves satisfactory results on the tuned region, the control accuracy diminished as the distance from the region increased. This is most prominent in the shoulder joint, and with tasks requesting a decrease in angle. The shoulder joint experiences a significantly larger moment of inertia along with compounding nonlinear dynamics which the PID controller struggles to account for. This indicates that the PID controller is sufficient for simple tasks such as controlling a one-joint one-link mechanism. Thus, fine-tuning a simulation-trained reinforcement learning agent provides a method for solving more complex dynamic problems.

Regarding control of these joints, reinforcement learning has the potential to generalize in the case of complicated joint-link combinations and varying dynamics. Use of SAC algorithm achieved great results. It is envisioned that additional modifications may be used to speed up training and expand generalization such as: Hindsight Experience Replay (HER), domain randomization, actuator randomization, curriculum learning, meta-learning and more. Since this manipulator is similar to the human arm, there is potential to use motion capture data, enabling techniques which use expert demonstrations such as apprenticeship learning and generative adversarial imitation learning (GAIL).

While the present disclosure only provided three different joint designs (i.e., perforated, semi-perforated, and solid) various other designs are contemplated. Characterization of how each design parameter directly influences the dynamics could yield programmable soft-rigid joints. The design of the manipulator can be sophisticated and refined to provide additional primary degrees of freedom and more exact motion. Also, while the involved tasks (i.e., increasing steps, decreasing steps, sinewave) are representative of static and dynamic goals, they are not exhaustive and other tasks suitable for developing control agents are contemplated. A study examining tasks which best train an agent across the whole state-space would highlight the advantages provided by the proposed training pipeline.

Furthermore, a strength of the joint design is that it aids load bearing tasks while diminishing external disturbances. Such tasks could involve adapting to varying loads strictly through observing the changed dynamics or performing high-level tasks such as object manipulation. Currently the proposed manipulator uses gravity and spring force to open the joints, yet antagonistic motors are biological and grant tunable compliance. In human arms, injuries show obvious modifications of strain curves which influences bio-mechanical properties, and the proposed system may be used to generate similar modifications. This disclosure provides a platform to produce a variety of robot arms mechanically akin to healthy/injured human arms, damaged/fatigued iterations, limbs with desired joint properties, and more. Furthermore, this disclosure provides foundational steps leading to a future where users can design a task, and simulations optimize the design and creation of a robot which best serves the task.

This disclosure also verified the ability to adjust the joint dynamics through varying the quantity of through-holes in the elastic membrane of each joint, experimentally testing three conditions: perforated, semi-perforated, and solid. The through-holes act as parallel spring-damper systems, effectively adjusting the non-linear dynamics. Experimentally the disclosure analyzed the stiffness in FIGS. 10-13, and the damping in FIGS. 14-17. Non-linearities manifested primarily in the form of hysteresis, time delays, and higher order functions. The results clearly support a need for data-driven non-linear estimators, and the parameters found proved to be sufficient for simulations which inform learning algorithms.

It will be appreciated that of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims. Unless specifically recited in a claim, steps or components according to claims should not be implied or imported from the specification or any other claims as to any particular order, number, position, size, shape, angle, or material.

What is claimed is:
1. A robotic arm comprising:
   a first link;
   a second link;
   a joint interconnecting the first link and the second link, such that the first link is movable relative to the second link along an axis of motion, the joint including:
      a socket component coupled to a distal end portion of the second link;
      a ball component coupled to a proximal end portion of first link, the ball component configured to rotationally fit within the socket component; and
      a flexible membrane encasing the socket component and the ball component.
2. The robotic arm according to claim 1, wherein the socket component includes a first plurality of through-holes.
3. The robotic arm according to claim 2, wherein the ball component includes a second plurality of through-holes.
4. The robotic arm according to claim 2, wherein the first plurality of through-holes is disposed in a first socket plane and a second socket plane.
5. The robotic arm according to claim 4, wherein the first socket plane and the second socket plane are perpendicular to each other and are aligned with the axis of motion.
6. The robotic arm according to claim 3, wherein the second plurality of through-holes is disposed in a first ball plane and a second ball plane.
7. The robotic arm according to claim 6, wherein the first ball plane and the second ball plane are perpendicular to each other and are aligned with the axis of motion.
8. The robotic arm according to claim 3, wherein the flexible membrane is disposed within a space defined by the first plurality of through-holes and the second plurality of through-holes.
9. The robotic arm according to claim 1, wherein the flexible membrane is formed from an elastomer.
10. The robotic arm according to claim 1, further comprising an actuator coupled to the second link and a cable coupled to the first link, wherein the actuator is configured to move the first link by spooling the cable.
11. The robotic arm according to claim 10, wherein each of the socket component and the ball component includes at least one routing block configured to route the cable around the joint.
12. A method of manufacturing a robotic joint, the method comprising:
   forming a first plurality of through-holes in a ball component;
   forming a second plurality of through-holes in a socket component; and
   inserting the ball component into the socket component to form a robotic joint, wherein the ball component is movable relative to the socket component along an axis of motion.
13. The method according to claim 12, further comprising:
   applying a flexible membrane over the robotic joint and within a space defined by the first plurality of through-holes and the second plurality of through-holes.
14. The method according to claim 13, wherein applying the flexible membrane includes placing the robotic joint in a mold and pouring a liquid precursor composition of the flexible membrane.
15. The method according to claim 12, wherein the first plurality of through-holes is disposed in a first socket plane and a second socket plane and the first socket plane and the second socket plane are perpendicular to each other and are aligned with the axis of motion.
16. The method according to claim 12, wherein the second plurality of through-holes is disposed in a first ball plane and a second ball plane and the first ball plane and the second ball plane are perpendicular to each other and are aligned with the axis of motion.

17. A method for programming a control agent for controlling a robotic arm, the method comprising:
   running a simulation of a robotic arm based on a plurality of physical parameters on a workstation;
   training a reinforcement learning algorithm based on the simulation of the robotic arm; and
   loading a control agent including the reinforcement learning algorithm into a controller controlling the robotic arm.

18. The method according to claim 17, wherein training includes:
   performing a plurality of tasks to reach a random point a three-dimensional space of the simulation.

19. The method according to claim 18, wherein training further includes:
   implementing a reward function configured to minimize distance traveled to the random point.

20. The method according to claim 17, further comprising:
   retraining the reinforcement learning algorithm based on operation of the robotic arm in a physical space.

* * * * *